(12) United States Patent
Shimezawa et al.

(10) Patent No.: US 9,560,644 B2
(45) Date of Patent: Jan. 31, 2017

(54) BASE STATION, TERMINAL, COMMUNICATION SYSTEM, COMMUNICATION METHOD, AND INTEGRATED CIRCUIT

(71) Applicant: Sharp Kabushiki Kaisha, Osaka-shi, Osaka (JP)

(72) Inventors: Kazuyuki Shimezawa, Osaka (JP); Toshizo Nogami, Osaka (JP); Naoki Kusashima, Osaka (JP); Kimihiko Imamura, Osaka (JP); Daiichiro Nakashima, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/418,319

(22) PCT Filed: Jul. 8, 2013

(86) PCT No.: PCT/JP2013/068594
§ 371 (c)(1),
(2) Date: Jan. 29, 2015

(87) PCT Pub. No.: WO2014/021061
PCT Pub. Date: Feb. 6, 2014

(65) Prior Publication Data
US 2015/0304993 A1    Oct. 22, 2015

(30) Foreign Application Priority Data
Aug. 1, 2012  (JP) ................................ 2012-170692

(51) Int. Cl.
H04W 72/04     (2009.01)
H04L 5/00      (2006.01)
(Continued)

(52) U.S. Cl.
CPC ............ *H04W 72/042* (2013.01); *H04L 5/001* (2013.01); *H04L 5/005* (2013.01); *H04L 5/0023* (2013.01);
(Continued)

(58) Field of Classification Search
CPC ..... H04B 7/0452; H04B 7/0602; H04B 7/024; H04W 72/04; H04W 72/0406; H04W 72/042; H04W 72/12; H04L 1/0061; H04L 1/1812; H04L 1/1861; H04L 5/0023; H04L 5/0053; H04J 11/00; H04J 11/0053
See application file for complete search history.

(56) References Cited

U.S. PATENT DOCUMENTS 8,982,693 B2 * 3/2015 Krishnamurthy ..... H04W 52/50
                                                    370/216
9,001,798 B2 * 4/2015 Papasakellariou  H04W 72/0406
                                                    370/336
(Continued)

FOREIGN PATENT DOCUMENTS

CN     102395206 A    3/2012
EP     2 779 768 A1   9/2014

OTHER PUBLICATIONS

3GPP TR 36.819, V11.0.0, "3rd Generation Partnership Project; Technical Specification Group Radio Access Network; Coordinated multi-point operation for LTE physical layer aspects (Release 11)," Sep. 2011, pp. 1-68.

(Continued)

*Primary Examiner* — Bunjob Jaroenchonwanit
(74) *Attorney, Agent, or Firm* — Keating & Bennett, LLP

(57) ABSTRACT

In a wireless communication system in which a base station and a terminal communicate, the base station effectively transmits control information for the terminal.

(Continued)

| E-REG NUMBER | COMBINATION OF RESOURCE ELEMENTS (k,l) IN SLOT 0 | COMBINATION OF RESOURCE ELEMENTS (k,l) IN SLOT 1 |
|---|---|---|
| 0 | (0,0), (8,0), (5,1), (2,2), (10,2), (7,3), (0,4), (8,4), (2,6) | (6,0), (3,1), (11,1), (4,2), (1,3), (9,3), (6,4), (3,5), (4,6) |
| 1 | (4,0), (1,1), (9,1), (6,2), (3,3), (11,3), (4,4), (9,5) | (2,0), (10,0), (7,1), (0,2), (8,2), (5,3), (2,4), (10,4), (7,5), (8,6) |
| 2 | (1,0), (9,0), (6,1), (3,2), (11,2), (4,3), (1,4), (9,4), (3,6) | (3,0), (11,0), (4,1), (1,2), (9,2), (6,3), (3,4), (11,4), (8,5) |
| 3 | (5,0), (2,1), (10,1), (7,2), (0,3), (8,3), (5,4), (2,5), (7,6) | (7,0), (0,1), (8,1), (5,2), (2,3), (10,3), (7,4), (4,5), (9,6) |
| 4 | (2,0), (10,0), (7,1), (0,2), (8,2), (5,3), (2,4), (10,4), (7,5), (8,6) | (4,0), (1,1), (9,1), (6,2), (3,3), (11,3), (4,4), (9,5) |
| 5 | (6,0), (3,1), (11,1), (4,2), (1,3), (9,3), (6,4), (3,5), (4,6) | (0,0), (8,0), (5,1), (2,2), (10,2), (7,3), (0,4), (8,4), (2,6) |
| 6 | (3,0), (11,0), (4,1), (1,2), (9,2), (6,3), (3,4), (11,4), (8,5) | (1,0), (9,0), (6,1), (3,2), (11,2), (4,3), (1,4), (9,4), (3,6) |
| 7 | (7,0), (0,1), (8,1), (5,2), (2,3), (10,3), (7,4), (4,5), (9,6) | (5,0), (2,1), (10,1), (7,2), (0,3), (8,3), (5,4), (2,5), (7,6) |

The base station that communicates with the terminal by using resource elements configured with OFDM symbols and subcarriers, and resource block pairs configured with a predetermined number of resource elements includes a second control channel generation unit that generates a second control channel which is transmitted by using a reference signal of an antenna port different from an antenna port of a first control channel. The second control channel is configured with predetermined E-REGs, and transmitted to the terminal, by using one or more E-CCEs. The resource block pair is configured with a predetermined number of E-REG sets. The E-REG set is configured with a predetermined number of the E-REGs. The E-REG is configured with a predetermined number of resource elements.

4 Claims, 13 Drawing Sheets

(51) Int. Cl.
  *H04L 27/26* (2006.01)
  *H04W 88/02* (2009.01)
  *H04W 88/08* (2009.01)

(52) U.S. Cl.
  CPC ........... *H04L 5/0035* (2013.01); *H04L 5/0048* (2013.01); *H04L 5/0051* (2013.01); *H04L 5/0053* (2013.01); *H04L 5/0073* (2013.01); *H04L 27/26* (2013.01); *H04L 5/0016* (2013.01); *H04L 27/2613* (2013.01); *H04W 88/02* (2013.01); *H04W 88/08* (2013.01)

(56) References Cited

U.S. PATENT DOCUMENTS

| | | | | |
|---|---|---|---|---|
| 9,072,086 | B2* | 6/2015 | Papasakellariou | H04W 72/0406 |
| 2013/0039299 | A1* | 2/2013 | Papasakellariou | H04L 1/0073 370/329 |
| 2013/0194931 | A1* | 8/2013 | Lee | H04L 5/0053 370/241 |
| 2013/0286980 | A1* | 10/2013 | Liao | H04W 72/042 370/329 |
| 2013/0301561 | A1* | 11/2013 | Sartori | H04W 72/04 370/329 |
| 2014/0003375 | A1* | 1/2014 | Nam | H04W 72/0406 370/329 |
| 2015/0139104 | A1* | 5/2015 | Seo | H04W 72/042 370/329 |
| 2015/0208389 | A1* | 7/2015 | Imamura | H04J 11/00 370/329 |
| 2015/0245322 | A1* | 8/2015 | Shimezawa | H04L 5/0053 370/329 |
| 2015/0271788 | A1* | 9/2015 | Kim | H04L 5/0053 370/329 |
| 2015/0296488 | A1* | 10/2015 | Shimezawa | H04W 72/04 370/329 |
| 2015/0296491 | A1* | 10/2015 | Nam | H04W 72/0406 370/329 |
| 2016/0020879 | A1* | 1/2016 | Shimezawa | H04W 16/32 370/329 |
| 2016/0020882 | A1* | 1/2016 | Shimezawa | H04L 5/0051 370/330 |
| 2016/0028521 | A1* | 1/2016 | Shimezawa | H04J 11/005 370/329 |
| 2016/0029351 | A1* | 1/2016 | Shimezawa | H04L 5/0053 370/329 |

OTHER PUBLICATIONS

NTT Docomo, "Views on Resource Mapping for ePDCCH", 3GPP TSG RAN WG1 Meeting #69, R1-121977, May 21-25, 2012, pp. 1-5.
Renesas Mobile Europe Ltd., "Resource mapping for ePDCCH", 3GPP TSG-RAN WG1 Meeting #69, R1-122359, May 21-25, 2012, 6 pages.
Official Communication issued in International Patent Application No. PCT/JP2013/068594, mailed on Aug. 6, 2013.
NEC Group, "ePDCCH Search Space Design", 3GPP TSG RAN WG1, Meeting #69, R1-122595, May 12, 2012, 10 pages.
Ericsson et al., "DCI Multiplexing by eREG", 3GPP TSG-RAN WG1 #69, R1-122001, May 12, 2012, 4 pages.
Intel Corporation, "Further Details about ePDCCH Search Space", 3GPP TSG RAN WG1, R1-122651, Meeting #69, May 12, 2012, 4 pages.
ASUSTeK, "Localized and Distributed ePDCCH USS Candidates in Same Subframe", 3GPP TSG RAN WG1, Meeting #69, R1-122613, May 12, 2012, 2 pages.
Samsung, "Implicit CCE to Uplink ACK/NACK Mapping in TDD," 3GPP TSG RAN WG1 Meeting #53bis, R1-082306, Jun. 25, 2008, pp. 1-5.

* cited by examiner

FIG. 6

| E-REG SET NUMBER | COMBINATION OF RESOURCE ELEMENTS (k,l) IN SLOT 0 | COMBINATION OF RESOURCE ELEMENTS (k,l) IN SLOT 1 |
|---|---|---|
| 0 | (0,0), (4,0), (8,0), (1,1), (5,1), (9,1), (2,2), (6,2), (10,2), (3,3), (7,3), (11,3), (0,4), (4,4), (8,4), (9,5), (2,6) | (2,0), (6,0), (10,0), (3,1), (7,1), (11,1), (0,2), (4,2), (8,2), (1,3), (5,3), (9,3), (2,4), (6,4), (10,4), (3,5), (7,5), (4,6), (8,6) |
| 1 | (1,0), (5,0), (9,0), (2,1), (6,1), (10,1), (3,2), (7,2), (11,2), (0,3), (4,3), (8,3), (1,4), (5,4), (9,4), (2,5), (3,6), (7,6) | (3,0), (7,0), (11,0), (0,1), (4,1), (8,1), (1,2), (5,2), (9,2), (2,3), (6,3), (10,3), (3,4), (7,4), (11,4), (4,5), (8,5), (9,6) |
| 2 | (2,0), (6,0), (10,0), (3,1), (7,1), (11,1), (0,2), (4,2), (8,2), (1,3), (5,3), (9,3), (2,4), (6,4), (10,4), (3,5), (7,5), (4,6), (8,6) | (0,0), (4,0), (8,0), (1,1), (5,1), (9,1), (2,2), (6,2), (10,2), (3,3), (7,3), (11,3), (0,4), (4,4), (8,4), (9,5), (2,6) |
| 3 | (3,0), (7,0), (11,0), (0,1), (4,1), (8,1), (1,2), (5,2), (9,2), (2,3), (6,3), (10,3), (3,4), (7,4), (11,4), (4,5), (8,5), (9,6) | (1,0), (5,0), (9,0), (2,1), (6,1), (10,1), (3,2), (7,2), (11,2), (0,3), (4,3), (8,3), (1,4), (5,4), (9,4), (2,5), (3,6), (7,6) |

FIG. 7

| E-REG SET NUMBER | COMBINATION OF E-REG NUMBERS |
|---|---|
| 0 | 0, 1, 2, 3 |
| 1 | 4, 5, 6, 7 |
| 2 | 8, 9, 10, 11 |
| 3 | 12, 13, 14, 15 |

FIG. 9

| E-REG NUMBER | COMBINATION OF RESOURCE ELEMENTS (k,l) IN SLOT 0 | COMBINATION OF RESOURCE ELEMENTS (k,l) IN SLOT 1 |
|---|---|---|
| 0 | (0,0), (5,1), (10,2), (0,4), (2,6) | (3,1), (4,2), (9,3), (3,5) |
| 1 | (4,0), (9,1), (3,3), (4,4) | (2,0), (7,1), (8,2), (2,4), (7,5) |
| 2 | (8,0), (2,2), (7,3), (8,4) | (6,0), (11,1), (1,3), (6,4), (4,6) |
| 3 | (1,1), (6,2), (11,3), (9,5) | (10,0), (0,2), (5,3), (10,4), (8,6) |
| 4 | (1,0), (6,1), (11,2), (1,0), (3,6) | (11,0), (1,2), (6,3), (11,4) |
| 5 | (5,0), (10,1), (0,3), (5,4), (7,6) | (0,1), (5,2), (10,3), (4,5) |
| 6 | (9,0), (3,2), (4,3), (9,4) | (3,0), (4,1), (9,2), (3,4), (8,5) |
| 7 | (2,1), (7,2), (8,3), (2,5) | (7,0), (8,1), (2,3), (7,4), (9,6) |
| 8 | (2,0), (7,1), (8,2), (2,4), (7,5) | (4,0), (9,1), (3,3), (4,4) |
| 9 | (6,0), (11,1), (1,3), (6,4), (4,6) | (8,0), (2,2), (7,3), (8,4) |
| 10 | (10,0), (0,2), (5,3), (10,4), (8,6) | (1,1), (6,2), (11,3), (9,5) |
| 11 | (3,1), (4,2), (9,3), (3,5) | (0,0), (5,1), (10,2), (0,4), (2,6) |
| 12 | (3,0), (4,1), (9,2), (3,4), (8,5) | (9,0), (3,2), (4,3), (9,4) |
| 13 | (7,0), (8,1), (2,3), (7,4), (9,6) | (2,1), (7,2), (8,3), (2,5) |
| 14 | (11,0), (1,2), (6,3), (11,4) | (1,0), (6,1), (11,2), (1,4), (3,6) |
| 15 | (0,1), (5,2), (10,3), (4,5) | (5,0), (10,1), (0,3), (5,4), (7,6) |

FIG. 10

| E-REG SET NUMBER | COMBINATION OF E-REG NUMBERS |
|---|---|
| 0 | 0, 1 |
| 1 | 2, 3 |
| 2 | 4, 5 |
| 3 | 6, 7 |

FIG. 12

| E-REG NUMBER | COMBINATION OF RESOURCE ELEMENTS (k,l) IN SLOT 0 | COMBINATION OF RESOURCE ELEMENTS (k,l) IN SLOT 1 |
|---|---|---|
| 0 | (0,0), (8,0), (5,1), (2,2), (10,2), (7,3), (0,4), (8,4), (2,6) | (6,0), (3,1), (11,1), (4,2), (1,3), (9,3), (6,4), (3,5), (4,6) |
| 1 | (4,0), (1,1), (9,1), (6,2), (3,3), (11,3), (4,4), (9,5) | (2,0), (10,0), (7,1), (0,2), (8,2), (5,3), (2,4), (10,4), (7,5), (8,6) |
| 2 | (1,0), (9,0), (6,1), (3,2), (11,2), (4,3), (1,4), (9,4), (3,6) | (3,0), (11,0), (4,1), (1,2), (9,2), (6,3), (3,4), (11,4), (8,5) |
| 3 | (5,0), (2,1), (10,1), (7,2), (0,3), (8,3), (5,4), (2,5), (7,6) | (7,0), (0,1), (8,1), (5,2), (2,3), (10,3), (7,4), (4,5), (9,6) |
| 4 | (2,0), (10,0), (7,1), (0,2), (8,2), (5,3), (2,4), (10,4), (7,5), (8,6) | (4,0), (1,1), (9,1), (6,2), (3,3), (11,3), (4,4), (9,5) |
| 5 | (6,0), (3,1), (11,1), (4,2), (1,3), (9,3), (6,4), (3,5), (4,6) | (0,0), (8,0), (5,1), (2,2), (10,2), (7,3), (0,4), (8,4), (2,6) |
| 6 | (3,0), (11,0), (4,1), (1,2), (9,2), (6,3), (3,4), (11,4), (8,5) | (1,0), (9,0), (6,1), (3,2), (11,2), (4,3), (1,4), (9,4), (3,6) |
| 7 | (7,0), (0,1), (8,1), (5,2), (2,3), (10,3), (7,4), (4,5), (9,6) | (5,0), (2,1), (10,1), (7,2), (0,3), (8,3), (5,4), (2,5), (7,6) |

BASE STATION, TERMINAL, COMMUNICATION SYSTEM, COMMUNICATION METHOD, AND INTEGRATED CIRCUIT

TECHNICAL FIELD

The present invention relates to a base station, a terminal, a communication system, a communication method, and an integrated circuit.

BACKGROUND ART

In general, in a wireless communication system such as Wideband Code Division Multiple Access (WCDMA) (registered trademark) by Third Generation Partnership Project (3GPP), Long Term Evolution (LTE), LTE-Advanced (LTE-A), and wireless LAN by The Institute of Electrical and Electronics engineers (IEEE), Worldwide Interoperability for Microwave Access (WiMAX), a base station (a cell, a transmission station, a transmission device, and an eNodeB), and a terminal (a mobile terminal, a reception station, a mobile station, a reception device, and User Equipment (UE)) each has a plurality of transmitting and receiving antennas, and spatially multiplexes data signals by using a multi input multi output (MIMO) technology so as to realize high-speed data communication.

In such a wireless communication system, in a case of transmitting downlink data (a transport block for a downlink shared channel (DL-SCH)) to a terminal, the base station multiplexes and transmits demodulation reference signals (DMRS) which are known to the base station and the terminal. Here, the demodulation reference signal is also referred to as a user equipment-specific reference signal (a UE-specific RS, or a terminal-specific RS). Here, the demodulation reference signals are simply denoted as reference signals.

For example, before a precoding process is applied, the reference signal is multiplexed with the downlink data. Therefore, the terminal can measure an equalization channel including the applied precoding process and the propagation path state, by using the reference signal. In other words, the terminal can demodulate the downlink data, even if it is notified of the precoding process that is applied by the base station.

Here, the downlink data is mapped to a physical downlink shared channel (PDSCH). In other words, the reference signal is used to demodulate the PDSCH. Further, for example, the reference signal is transmitted only in resource blocks (referred to as a physical resource block, or a resource) to which the corresponding PDSCH is mapped.

Here, wireless communication system using heterogeneous network (HetNet) deployment which is configured with a macro base station having a wide coverage and a remote radio head (RRH) having coverage narrower than that of the macro base station has been developed. FIG. 13 is a schematic diagram of a wireless communication system using heterogeneous network deployment. As illustrated in FIG. 13, for example, the heterogeneous network is configured with a macro base station 1301, an RRH 1302, and an RRH 1303.

In FIG. 13, the macro base station 1301 has coverage 1305, and the RRH 1302 and the RRH 1303 respectively have coverage 1306 and coverage 1307. Further, the macro base station 1301 is connected with the RRH 1302 through a line 1308, and is connected with the RRH 1303 through a line 1309. Thus, the macro base station 1301 can transmit and receive data signals and control signals (control information) to and from the RRH 1302 and the RRH 1303. Here, for example, a wired line such as an optical fiber and a wireless line using a relay technology are used for the line 1308 and the line 1309. In this case, some or all of the macro base station 1301, the RRH 1302, and RRH 1303 use the same resource, thereby allowing overall frequency utilization efficiency (transmission capacity) in an area of the coverage 1305 to be improved.

Further, when a terminal 1304 is located within the coverage 1306, the terminal 1304 can perform single-cell communication with the RRH 1302. Further, when the terminal 1304 is located near the end of the coverage 1306 (cell edge), measures for co-channel interference from the macro base station 1301 may be required. Here, a method of reducing or suppressing the interference for the terminal 1304 located in the cell edge by performing inter-base station cooperative communication in which adjacent base stations are cooperative with each other has been studied, as multi-cell communication between the macro base station 1301 and the RRH 1302. For example, a cooperative multipoint (COMP) transmission scheme and the like have been considered as measures for reducing or suppressing the interference caused by the inter-base station cooperative communication (NPL 1).

CITATION LIST

Non Patent Literature

NPL 1: 3rd Generation Partnership Project; Technical Specification Group Radio Access Network; Coordinated multipoint operation for LTE physical layer aspects (Release 11), September, 2011, 3GPP TR 36.819 V11.0.0 (2011-09)

SUMMARY OF INVENTION

Technical Problem

However, in a case of using a general method as a notification method of control information for a terminal from a base station in the heterogeneous network deployment and/or the CoMP transmission scheme, a problem of a capacity of a notification area of the control information occurs. As a result, since it is difficult to effectively transmit the control information for the terminal from the base station, it is a factor that prevents the improvement of the transmission efficiency in the communication between the base station and the terminal.

The present invention has been made in view of the above problems, an object is to provide a base station, a terminal, a communication system, a communication method, and an integrated circuit, in which the base station can effectively transmit control information for the terminal in a communication system in which the base station and the terminal communicate.

Solution to Problem (1) The invention has been made to solve the above problems, a communication system according to an aspect of the present invention is a communication system in which a base station device and a terminal device communicate by using a plurality of resource block pairs of which each is configured with a plurality of resource elements of which each is defined in a time domain and a frequency domain, in which an enhanced physical control channel used in communication between the base station device and the terminal device is configured with one or more enhanced control channel elements, the enhanced control channel element is configured with a plurality of enhanced resource element groups, the enhanced resource element groups are mapped to respective resource elements, the mapping uses one type of sequence of numbers which are assigned to respective resource elements constituting the resource block pair, and correspond to numbers indicating the enhanced resource element groups, a distributed mapping in which the respective enhanced control channel elements are mapped to the plurality of resource block pairs, or a localized mapping in which the respective enhanced control channel elements are mapped to one resource block pair are available, in the distributed mapping, the enhanced control channel element is mapped by using a different number, which is one of the numbers, for each resource block pair, in each of the plurality of resource block pairs used in transmission of the respective enhanced control channel elements, in the localized mapping, the enhanced control channel elements are mapped by using the plurality of numbers, in one resource block pair used in transmission of the respective enhanced control channel elements, the number used in mapping of the enhanced control channel elements is common in the distributed mapping and the localized mapping, the base station device generates the enhanced physical control channel based on the mapping, and transmits the enhanced physical control channel to the terminal device, and the terminal device receives the enhanced physical control channels based on the mapping.

(2) Further, a base station device according to an aspect of the present invention is a base station device used in a communication system according to an aspect of the present invention is a communication system in which a base station device and a terminal device communicate by using a plurality of resource block pairs of which each is configured with a plurality of resource elements of which each is defined in a time domain and a frequency domain, includes a control channel generation unit that generates enhanced physical control channels used in communication with the terminal device, in which the enhanced physical control channel is configured with a plurality of enhanced control channel elements, the enhanced control channel element is configured with a plurality of enhanced resource element groups, the enhanced resource element groups are mapped to respective resource elements, the mapping uses one type of sequence of numbers which are assigned to respective resource elements constituting the resource block pair, and correspond to numbers indicating the enhanced resource element groups, a distributed mapping in which the respective enhanced control channel elements are mapped to the plurality of resource block pairs, or a localized mapping in which the respective enhanced control channel elements are mapped to one resource block pair are available, in the distributed mapping, the enhanced control channel element is mapped by using a different number, which is one of the numbers, for each resource block pair, in each of the plurality of resource block pairs used in transmission of the respective enhanced control channel elements, in the localized mapping, the enhanced control channel elements are mapped by using the plurality of numbers, in one resource block pair used in transmission of the respective enhanced control channel elements, the number used in mapping of the enhanced control channel elements is common in the distributed mapping and the localized mapping, and the enhanced physical control channels generated by the control channel generation unit is transmitted to the terminal device.

(3) Further, a processing method of a base station device according to an aspect of the present invention is a processing method of a base station device used in a communication system according to an aspect of the present invention is a communication system in which a base station device and a terminal device communicate by using a plurality of resource block pairs of which each is configured with a plurality of resource elements of which each is defined in a time domain and a frequency domain, in which an enhanced physical control channel used by the base station device in communication with the terminal device is configured with a plurality of enhanced control channel elements, each of the enhanced control channels is configured with a plurality of enhanced resource element groups, the enhanced resource element groups are mapped to respective resource elements, the mapping uses one type of sequence of numbers which are assigned to respective resource elements constituting the resource block pair, and correspond to numbers indicating the enhanced resource element groups, a distributed mapping in which the respective enhanced control channel elements are mapped to the plurality of resource block pairs, or a localized mapping in which the respective enhanced control channel elements are mapped to one resource block pair are available, in the distributed mapping, the enhanced control channel element is mapped by using a different number, which is one of the numbers, for each resource block pair, in each of the plurality of resource block pairs used in transmission of the respective enhanced control channel elements, in the localized mapping, the enhanced control channel elements are mapped by using the plurality of numbers, in one resource block pair used in transmission of the respective enhanced control channel elements, the number used in mapping of the enhanced control channel elements is common in the distributed mapping and the localized mapping, and the base station device transmits the enhanced physical control channels to the terminal device.

(4) Further, a terminal device according to an aspect of the present invention is a terminal device used in a communication system according to an aspect of the present invention is a communication system in which a base station device and a terminal device communicate by using a plurality of resource block pairs of which each is configured with a plurality of resource elements of which each is defined in a time domain and a frequency domain, which includes a reception unit that receives enhanced physical control channels used in communication with the base station device, in which each of the enhanced physical control channels is configured with one or more enhanced control channel elements, each of the enhanced control channels is configured with a plurality of enhanced resource element groups, the enhanced resource element groups are mapped to respective resource elements, the mapping uses one type of sequence of numbers which are assigned to respective resource elements constituting the resource block pair, and correspond to numbers indicating the enhanced resource element groups, a distributed mapping in which the respective enhanced control channel elements are mapped to the plurality of resource block pairs, or a localized mapping in which the respective enhanced control channel elements are mapped to one resource block pair are available, in the distributed mapping, the enhanced control channel element is mapped by using a different number, which is one of the numbers, for each resource block pair, in each of the plurality of resource block pairs used in transmission of the respective enhanced control channel elements, in the localized mapping, the enhanced control channel elements are mapped by using the plurality of numbers, in one resource block pair used in transmission of the respective enhanced control channel elements, the number used in mapping of the enhanced control channel elements is common in the distributed mapping and the localized mapping, and the reception unit receives the enhanced physical control channels transmitted from the base station device, based on the mapping.

(5) Further, a processing method of a terminal device according to an aspect of the present invention is a processing method of a terminal device used in a communication system according to an aspect of the present invention is a communication system in which a base station device and a terminal device communicate by using a plurality of resource block pairs of which each is configured with a plurality of resource elements of which each is defined in a time domain and a frequency domain, in which an enhanced physical control channel used in communication between the base station device and the terminal device is configured with one or more enhanced control channel elements, the enhanced control channel is configured with a plurality of enhanced resource element groups, the enhanced resource element groups are mapped to respective resource elements, the mapping uses one type of sequence of numbers which are assigned to respective resource elements constituting the resource block pair, and correspond to numbers indicating the enhanced resource element groups, a distributed mapping in which the respective enhanced control channel elements are mapped to the plurality of resource block pairs, or a localized mapping in which the respective enhanced control channel elements are mapped to one resource block pair are available, in the distributed mapping, the enhanced control channel element is mapped by using a different number, which is one of the numbers, for each resource block pair, in each of the plurality of resource block pairs used in transmission of the respective enhanced control channel elements, in the localized mapping, the enhanced control channel elements are mapped by using the plurality of numbers, in one resource block pair used in transmission of the respective enhanced control channel elements, the number used in mapping of the enhanced control channel elements is common in the distributed mapping and the localized mapping, and the terminal device receives the enhanced physical control channels which are generated by and transmitted from the base station device, based on the mapping.

Advantageous Effects of Invention

According to the present invention, a base station can effectively transmit control information for a terminal in a wireless communication system in which the base station and the terminal communicate.

BRIEF DESCRIPTION OF DRAWINGS

FIG. 6 is a diagram illustrating an example of a combination of resource elements for the E-REG set according to the first embodiment of the present invention.

FIG. 7 is a diagram illustrating an example of a combination of E-REGs for the E-REG set according to the first embodiment of the present invention.

FIG. 9 is a diagram illustrating an example of a combination of resource elements for the E-REG according to the first embodiment of the present invention.

FIG. 10 is a diagram illustrating an example of a combination of E-REGs for the E-REG set according to the first embodiment of the present invention.

FIG. 12 is a diagram illustrating an example of a combination of resource elements for the E-REG according to the first embodiment of the present invention.

DESCRIPTION OF EMBODIMENTS

First Embodiment

Figure 1:
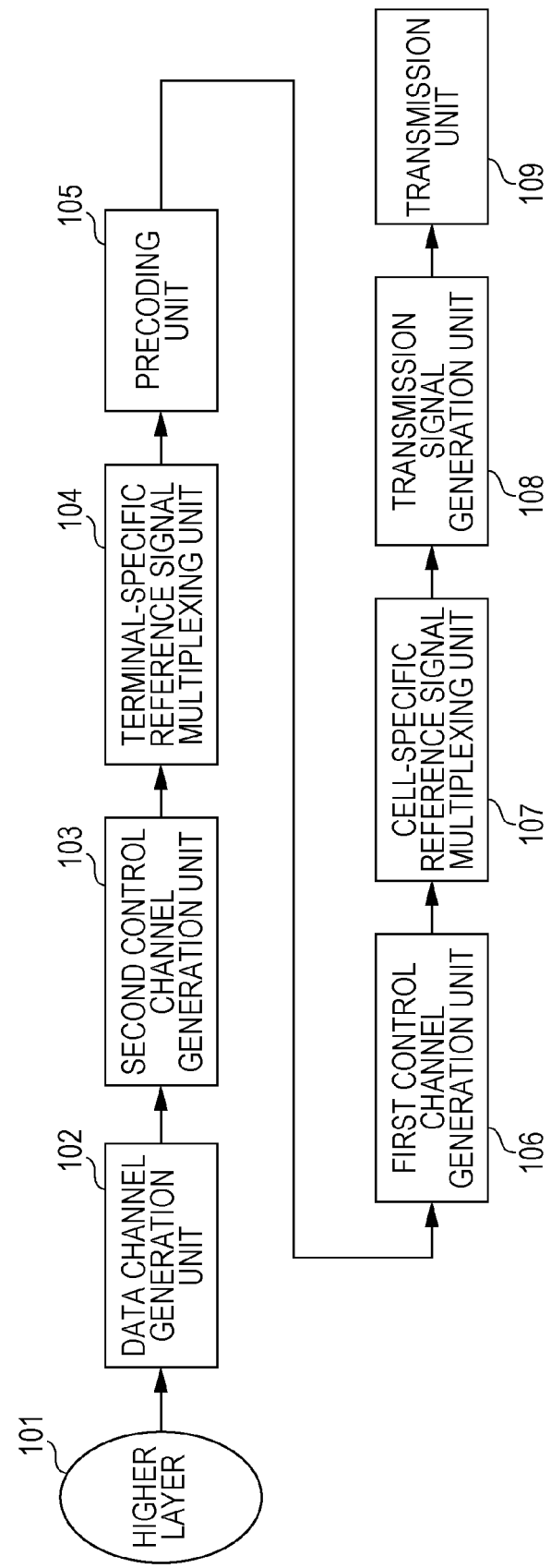
FIG. 1 is a schematic block diagram illustrating a Configuration of a base station 100 according to a first embodiment of the present invention.

Hereinafter, a first embodiment of the present invention will be described. A communication system in the first embodiment includes a base station (a transmission device, a cell, a transmitting point, a transmission antenna group, a transmission antenna port group, a component carrier, and eNodeB), and a terminal (a terminal device, a mobile terminal, a receiving point, a reception terminal, a reception device, a reception antenna group, a reception antenna port group, and UE).

In the communication system of the present invention, since the base station 100 performs data communication with the terminal 200, the base station 100 transmits control information, and information data through a downlink.

Here, the control information is subjected to an error detection coding process and the like, and mapped to a control channel. The control channel (physical downlink control channel (PDCCH)) is subjected to an error correction coding process and a modulation process, and transmitted and received through a first control channel (a first physical control channel) region or a second control channel (second physical control channel) region different from the first control channel region. Here, the physical control channel referred to here is a type of the physical channel, and a control channel defined on a physical frame. Further, hereinafter, the control channel mapped to the first control channel region is referred to as a first control channel, and the control channel mapped to the second control channel region is referred to as a second control channel. Further, the first control channel is also referred to as PDCCH, and the second control channel is also referred to as enhanced PDCCH (E-PDCCH).

Further, when viewed from one perspective, the first control channel is a physical control channel using the same transmission port (antenna port) as that of the cell-specific reference signal. Further, the second control channel is a physical control channel using the same transmission port as that of the terminal-specific reference signal. The terminal 200 demodulates the first control channel by using the cell-specific reference signal, and demodulates the second control channel by using the terminal-specific reference signal. The cell-specific reference signal is a reference signal common to all terminals in the cell, and is a reference signal available in any terminal, because it is inserted into almost all resources. Therefore, the first control channel can be demodulated by any terminal. Meanwhile, the terminal-specific reference signal is a reference signal inserted only into the allocated resource, and can be adaptively subjected to a precoding process or a beam forming process similar to data. In this case, it is possible to obtain a gain of adaptive precoding or beam forming, and a gain of frequency scheduling in the control channel disposed in the second control channel region. Further, the terminal-specific reference signal may be shared by a plurality of terminals. For example, the control channel disposed in the second control channel region is distributed into a plurality of resources (for example, resource block) and notified, the terminal-specific reference signal of the second control channel region can be shared by a plurality of terminals. In this case, it is possible to obtain a frequency diversity gain in the control channel disposed in the second control channel region.

Further, when viewed from a different perspective, the control channel mapped to the first control channel region is a physical control channel (first control channel) on OFDM symbols (symbols) located in the front part of the physical subframe, and may be disposed over the entire area of the system bandwidth (component carrier (CC)) of the OFDM symbols. Further, the control channel (second control channel) mapped to the second control channel region is a physical control channel on OFDM symbols located in the rear part of the first control channel of the physical subframe, and may be disposed on some of the system bandwidth of the OFDM symbols. Since the first control channel is disposed on the control channel dedicated OFDM symbol located in the front part of the physical subframe, the first control channel can be received and demodulated before the OFDM symbols in the rear part for the physical data channel. Further, the terminal that monitors only the control channel dedicated OFDM symbols can receive the first control channels. Further, since the first control channels are distributed and disposed over entire CC region, it is possible to randomize inter-cell interference. Further, the first control channel region is a region that is configured uniquely for the base station 100, and is a region common to all terminals connected to the base station 100. Meanwhile, the second control channels are disposed on the OFDM symbols in the rear part for the shared channel (physical data channel) that are commonly received by the terminal in communication. Further, it is possible to allow the second control channels to be orthogonal-multiplexed with each other, or the second control channel and the physical data channel to be orthogonal-multiplexed (multiplexed without interference) by frequency division multiplexing. Further, the second control channel region is a region which is configured uniquely to the terminal 200, and is a region which is configured for each terminal connected to the base station 100. In addition, the base station 100 can configure the second control channel region such that it is shared by a plurality of terminals. Further, the first control channel region and the second control channel region are disposed on the same physical subframe. Here, the OFDM symbol is a unit in a time direction for mapping the bits of each channel.

Further, when viewed from a different perspective, the first control channel is a cell-specific physical control channel, and is a physical channel that both a terminal in an idle state and a terminal in a connected state can acquire (detect). Further, the second control channel is a terminal-specific physical control channel, and is a physical channel that only a terminal in a connected state can acquire. Here, the idle state is a state in which data is not transmitted and received immediately such as a state (RRC_IDLE state) in which a base station does not store the information about radio resource control (RRC) and a state in which a mobile station performs discontinuous reception (DRX). Meanwhile, the connected state is a state in which data can be transmitted and received immediately such as a state (RRC_CONNECTED state) in which a terminal stores information about a network, and a state in which a mobile station does not perform discontinuous reception (DRX). The first control channel is a channel that can be received by the terminal 200, independently of the terminal-specific RRC signaling. The second control channel is a channel that is configured by the terminal-specific RRC signaling, and can be received by the terminal 200 by the terminal-specific RRC signaling. In other words, the first control channel is a channel that can be received by a certain terminal by the pre-defined configuration, and the second control channel is a channel of which terminal-specific configuration change is easy.

FIG. 1 is a schematic block diagram illustrating a configuration of a base station 100 according to a first embodiment of the present invention. In FIG. 1, the base station 100 includes a higher layer 101, a data channel generation unit 102, a second control channel generation unit 103, a terminal-specific reference signal multiplexing unit 104, a precoding unit 105, a first control channel generation unit 106, a cell-specific reference signal multiplexing unit 107, a transmission signal generation unit 108, and a transmission unit 109.

The higher layer 101 generates information data (transport block, and code word) for the terminal 200, and outputs the information data to the data channel region allocation unit 102. Here, the information data may be a unit of an error correction coding process. Further, the information data may a unit of retransmission control such as hybrid automatic repeat request (HARQ). Further, the base station 100 can transmit a plurality of pieces of information data to the terminal 200.

The data channel generation unit (a data channel region allocation unit, a data channel mapping unit, or a shared channel generation unit) 102 performs adaptive control on the information data which is output by the higher layer 101, and generates data channel (a shared channel, a common channel, or PDSCH; physical downlink shared channel) for the terminal 200. Specifically, as the adaptive control, the data channel generation unit 102 performs a coding process for performing error correction coding, a scrambling process for applying a scrambling code unique to the terminal 200, a modulation process for using a multilevel modulation schemes, and a layer mapping process for performing spatial multiplexing such as MIMO. Here, the layer mapping process of the data channel generation unit 102 performs mapping to one or more layers (streams), based on the number of ranks to be established to the terminal 200.

When the base station 100 transmits the control information for the terminal 200, through the second control channel region (terminal-specific control channel region), the second control channel generation unit (a second control channel region allocation unit, a second control channel mapping unit, or a terminal-specific control channel generation unit) 103 generates a control channel transmitted through the second control channel region. Here, when the second control channel region is configured in the shared channel region, the data channel generation unit 102 and the second control channel generation unit 103 are also referred to as a shared channel region allocation unit. In addition, the data channel and/or the second control channel are also referred to as shared channels. Further, the second control channel is also referred to as an enhanced PDCCH (E-PDCCH), and a terminal-specific control channel.

The terminal-specific reference signal multiplexing unit (a terminal-specific reference signal generation unit, a terminal-specific control channel demodulation reference signal multiplexing unit, or a terminal-specific control channel demodulation reference signal generation unit) 104 generates a terminal-specific reference signal which is specific to the terminal 200 (a data channel demodulation reference signal, a second control channel demodulation reference signal, a shared channel demodulation reference signal, a terminal-specific control channel demodulation reference signal, a demodulation reference signal (DM-RS), a dedicated reference signal (DRS), a Precoded RS, UE-specific RS (UERS)), and multiplexes the terminal-specific reference signal into the shared channel region. Further, an initial value for generating a scrambling code constituting the terminal-specific reference signal is input to the terminal-specific reference signal multiplexing unit 104. The terminal-specific reference signal multiplexing unit 104 generates the terminal-specific reference signal, based on the initial value of the scrambling code which is input. Here, the terminal-specific reference signal is configured based on the data channel or the second control channel to be multiplexed, and is multiplexed to each layer (antenna port) of the data channel or the second control channel. In addition, the terminal-specific reference signal is preferably orthogonal and/or quasi-orthogonal between layers. In addition, the terminal-specific reference signal may be generated by the terminal-specific reference signal multiplexing unit 104 so as to be multiplexed by the transmission signal generation unit 108 which will be described later.

The precoding unit 105 performs a precoding process on the data channel, the second control channel, and/or the terminal-specific reference signal which are output by the terminal-specific reference signal multiplexing unit 104. Here, the precoding process may be different depending on whether the terminal-specific reference signal is shared by a plurality of terminals or the terminal-specific reference signal is used by one terminal. When the precoding process is used by the terminal 200, the precoding process preferably performs phase rotation and/or amplitude control on the input signal such that the terminal 200 can effectively receive the signal. For example, the precoding process is preferably performed such that the reception power of the terminal 200 is maximized, interference from the adjacent cell is reduced, or interference to the adjacent cell is reduced. Further, the precoding process can preferably use a process by a predetermined precoding matrix, cyclic delay diversity (CDD), transmission diversity (spatial frequency block code (SFBC), spatial time block code (STBC), time switched transmission diversity (ISTD), and frequency switched transmission diversity (FSTD)), but is not limited thereto. Further, when the terminal-specific reference signal is shared by a plurality of terminals, the precoding process can preferably use a process by a predetermined precoding matrix, CDD, and transmission diversity. Here, when the precoding matrix indicator (PMI) that is divided into a plurality of types as feedback information about the precoding process is fed back from the terminal 200 to the base station 100, the base station 100 can perform the precoding process, based on the result of the operation of multiplying the plurality of PMIs, to the terminal 200.

Here, the terminal-specific reference signal is a known signal to the base station 100 and the terminal 200. Here, when the precoding unit 105 performs a precoding process specific to the terminal 200, in a case where the terminal 200 demodulates the data channel and/or the second control channel, it is possible to estimate a downlink transmission path between the base station 100 and the terminal 200, and an equalization channel of a precoding weight by the precoding unit 105, with respect to the terminal-specific reference signal. In other words, there is no need for the base station 100 to notify the terminal 200 of the precoding weight by the precoding unit 105, and it is possible to demodulate the precoded signal.

When the base station 100 transmits the control information for the terminal 200 through the first control channel region (cell-specific control channel region), the first control channel generation unit (a first control channel region allocation unit, a first control channel mapping unit, or a cell-specific control channel generation unit) 106 generates a control channel to be transmitted through the first control channel region. Here, the control channel to be transmitted through the first control channel region is referred to as a first control channel. Further, the first control channel is referred to as a cell-specific control channel.

The cell-specific reference signal multiplexing unit (cell-specific reference signal generation unit) 107 generates a cell-specific reference signal which is known to the base station 100 and the terminal 200 (a transmission path status measurement reference signal, a common RS (CRS), a ell-specific RS, a Non-precoded RS, a cell-specific control channel demodulation reference signal, and a first control channel demodulation reference signal) in order to measure the transmission path status of the downlink between the base station 100 and the terminal 200. The generated cell-specific reference signal is multiplexed to the signal which is output by the first control channel generation unit 106. In addition, the cell-specific reference signal may be generated by the cell-specific reference signal multiplexing unit 107, and may be multiplexed in the transmission signal generation unit 108 which will be described later.

Here, if the cell-specific reference signal is a signal known to the base station 100 and the terminal 200, any signal (sequence) may be used. For example, it is possible to use a random number or pseudo-noise sequence based on the pre-assigned parameters such as a number specific to the base station 100 (cell ID). Further, it is possible to use a method of making resource elements for mapping the cell-specific reference signals as null (zero) between antenna ports, a method of performing a code division multiplexing using a pseudo-noise sequence, or a method of combining them, as a method of making the cell-specific reference signals to be orthogonal between antenna ports. In addition, the cell-specific reference signal may be multiplexed to all subframes, or only to some subframes.

Further, the cell-specific reference signal is a reference signal to be multiplexed after the precoding process by the precoding unit 105. Therefore, the terminal 200 can measure the transmission path status of the downlink between the base station 100 and the terminal 200, by using the cell-specific reference signal, and modulate the signal that has not been precoded by the precoding unit 105. For example, the first control channel can be demodulated by the cell-specific reference signal. The first control channel can be demodulated by the CRS.

The transmission signal generation unit (channel mapping unit) 108 maps the signals output by the cell-specific reference signal multiplexing unit 107 to the resource elements of respective antenna ports. Specifically, the transmission signal generation unit 108 maps data channel to the data channel region of the shared channel region, and maps the second control channel to the second control channel region of the shared channel region. Further, the transmission signal generation unit 108 maps the first control channel to the first control channel region different from the second control channel region. Here, the base station 100 can map the control channels addressed to a plurality of terminals to the first control channel region and/or the second control channel region. In addition, the base station 100 may map the data channel to the second control channel region. For example, when the second control channel is not mapped the second control channel region that has been configured by the base station 100 for the terminal 200, the data channel may be mapped to the second control channel region.

Here, the first control channel and the second control channel are the control channels which are respectively transmitted through different resources, and/or the control channels which are demodulated by using respective different reference signals, and/or control channels which can be transmitted depending on different RRC states of the terminal 200. Further, control information of any format can be mapped to the respective control channels. In addition, it is possible to define the format of control information that can be mapped to each control channel. For example, control information of all formats can be mapped to the first control channel, and control information of some formats can be mapped to the second control channel. For example, control information of all formats can be mapped to the first control channel, and control information of a format including allocation information of a data channel using the terminal-specific reference signal can be mapped to the second control channel.

Here, the PDCCH or the ePDCCH is used to notify (specify) the terminal of downlink control information (DCI). For example, the downlink control information includes information about the resource allocation of the PDSCH, information about a modulation and coding scheme (MCS), information about scrambling identity (also referred to as a scrambling link identifier), a reference signal sequence identity (also referred to as a base sequence identity, a base sequence identifier, and a base sequence index), and the like.

Further, a plurality of formats are defined for the downlink control information transmitted in the PDCCH or the ePDCCH. Here, the format of the downlink control information is referred to as a DCI format. In other words, a field for each piece of the uplink control information is defined in the DCI format.

For example, a DCI format 1 and a DCI format 1A which are used for scheduling of one PDSCH in one cell (transmission of a code word of one PDSCH and one downlink transport block) are defined as a downlink DCI format. In other words, the DCI format 1 and the DCI format 1A are used for transmission in the PDSCH using one transmission antenna port. Further, the DCI format 1 and the DCI format 1A are also used for transmission in the PDSCH by transmission diversity (TxD) using a plurality of transmission antenna ports.

Further, a DCI format 2, a DCI format 2A, a DCI format 2B, and a DCI format 2C which are used for scheduling of one PDSCH in one cell (transmission of code words up to two and downlink transport blocks up to two) are defined as a downlink DCI format. In other words, the DCI format 2, the DCI format 2A, the DCI format 2B, and the DCI format 2C are used for transmission in the multiple input multiple output spatial domain multiplexing (MIMO SDM) PDSCH using a plurality of transmission antenna ports.

Here, the format is predefined for the control information. For example, the control information can be defined depending on the purpose of the notification for terminal 200 by the base station 100. Specifically, the control information can be defined as the allocation information of a downlink data channel for the terminal 200, the allocation information of a uplink data channel (physical uplink shared channel: PUSCH) and a control channel (physical uplink control channel: PUCCH) for the terminal 200, information for controlling transmission power for the terminal 200, and the like. Therefore, for example, when transmitting the downlink information data to the terminal 200, the base station 100 transmits a control channel to which the control information including the allocation information of the downlink data channel for the terminal 200 is mapped, and a data channel to which information data allocated based on the control information is mapped. Further, for example, when the uplink data channel for the terminal 200 is allocated, the base station 100 transmits a control channel to which the control information including the allocation information of the uplink data channel for the terminal 200 is mapped. Further, the base station 100 can transmit a plurality of pieces of different control information or the same control information, in the same subframe, to the same terminal 200, in different formats or the same format. In addition, when transmitting the downlink information data to the terminal 200, the base station 100 can transmit the downlink data channel in a subframe different from the subframe for transmitting the control channel to which the control information including the allocation information of the downlink data channel for the terminal 200 is mapped.

Here, since the first control channel region is a region specific to the base station 100, the first control channel region is referred to as a cell-specific control channel region. Further, since the second control channel region is a region specific to the terminal 200 which is configured through a RRC signaling from the base station 100, the second control channel region is also referred to as a terminal-specific control channel region. Further, the second control channel region is configured, with a resource block pair as a unit. Here, the resource block pair is a region configured with two continuous resource blocks (RB) disposed in the time direction, here, one resource block is configured with a predetermined number of regions in a frequency direction and a predetermined number of regions in a time direction. Further, in the resource block pair, the resource blocks of the first half in the time direction are referred to as a first resource block, and the resource blocks of the second half in the time direction are referred to as a second resource block.

Further, the base station 100 and the terminal 200 transmit and receive signals in the higher layer. For example, the base station 100 and the terminal 200 transmit and receive a radio resource control signal (also referred to as radio resource control signal; RRC signaling, a radio resource control message; a RRC message, and radio resource control information; RRC information) in a RRC layer (layer 3). Here, in the RRC layer, a dedicated signal transmitted to a certain terminal by the base station 100 is referred to as a dedicated signal. In other words, the configuration (information) transmitted by the base station 100, by using the dedicated signal is a configuration unique (specific) to a certain terminal.

Further, the base station 100 and the terminal 200 transmit and receive a medium access control (MAC) control element in a MAC layer (layer 2). Here, the RRC signaling and/or the MAC control element are referred to as higher layer signaling.

After performing inverse fast Fourier transform (IFFT), addition of guard interval, and a transform process to a radio frequency on the input signals, the transmission unit 109 transmits the processed signals from the transmission antennas of the number of one or a plurality of transmission antennas (the number of transmission antenna ports).

Figure 2:
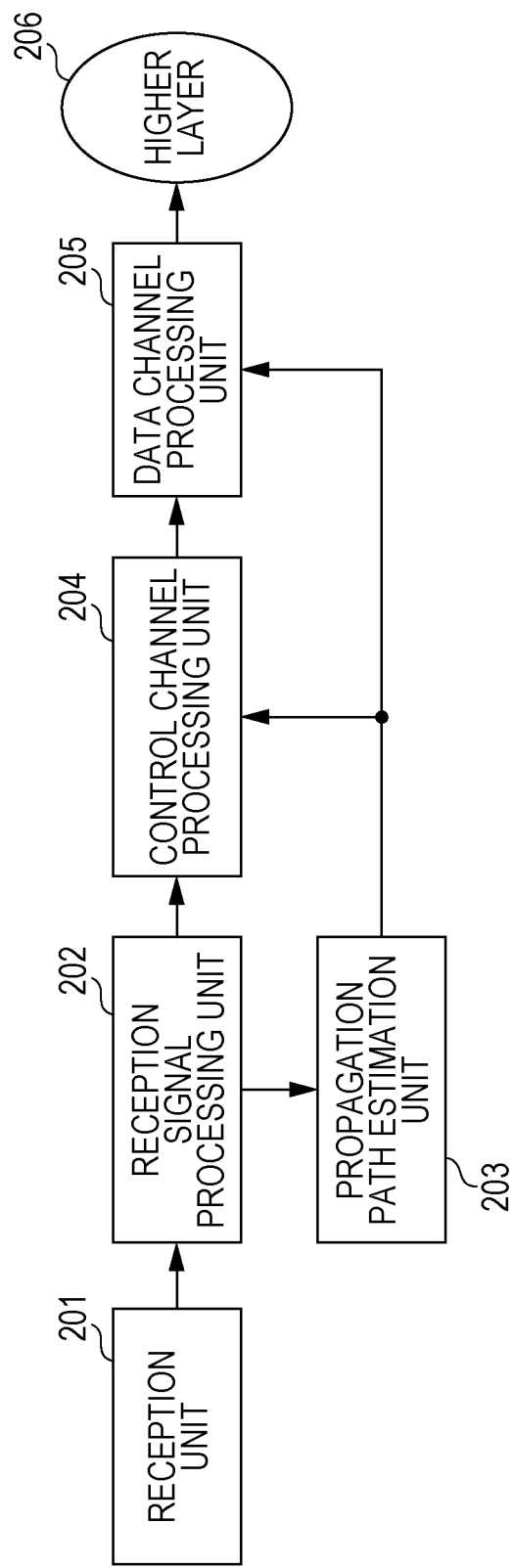
FIG. 2 is a schematic block diagram illustrating a Configuration of a terminal 200 according to the first embodiment of the present invention.

FIG. 2 is a schematic block diagram illustrating a configuration of a terminal 200 according to the first embodiment of the present invention. In FIG. 2, the terminal 200 includes a reception unit 201, a reception signal processing unit 202, a propagation path estimation unit 203, a control channel processing unit 204, a data channel processing unit 205, and a higher layer 206.

The receiving unit 201 receives signals transmitted from the base station 100 by the reception antennas of the number of one or a plurality of reception antennas (the number of reception antenna ports), and performs a conversion process from a radio frequency signal to a baseband signal, a removal of the added guard interval, a time-frequency conversion process such as fast Fourier transform (FFT) on the received signals.

The reception signal processing unit 202 de-maps (separates) the signals which has been mapped by the base station 100. Specifically, the reception signal processing unit 202 de-maps the first control channel, the second control channel, and/or the data channel, and outputs the de-mapped channels to the control channel processing unit 204. Further, the reception signal processing unit 202 de-maps the cell-specific reference signal and/or the terminal-specific reference signal which are multiplexed, and outputs the signals to the propagation path estimation unit 203.

The propagation path estimation unit 203 performs propagation estimation for resources of the first control channel, the second control channel, and/or the data channel, based on the cell-specific reference signal and/or the terminal-specific reference signal. The propagation path estimation unit 203 outputs the estimated result of the propagation path estimation to the control channel processing unit 204 and/or the data channel processing unit 205. The propagation path estimation unit 203 obtains a propagation path estimated value by estimating (channel estimation) a variation (a frequency response and a transfer function) in the amplitude and the phase of each resource element of each transmission antenna port for each reception antenna port, based on the terminal-specific reference signal which is multiplexed to the data channel and/or the second control channel. Here, an initial value of the scrambling code constituting the terminal-specific reference signal is input to the propagation path estimation unit 203, and the terminal-specific reference signal is determined based on the initial value and the like. Further, the propagation path estimation unit 203 obtains a propagation path estimated value by estimating a variation in the amplitude and the phase of each resource element of each transmission antenna port for each reception antenna port, based on the cell-specific reference signal which is multiplexed to the first control channel.

The control channel processing unit 204 searches for a control channel addressed to the terminal 200, which is mapped to the first control channel region and/or the second control channel region. Here, the control channel processing unit 204 configures the first control channel region and/or the second control channel region, as the control channel region for searching the control channel. The configuration of the second control channel region is performed by the base station 100, through the control information of the higher layer to be notified to the terminal 200 (for example, a radio resource control (RRC) signaling). For example, the configuration of the second control channel region is control information for configuration of the second control channel and configuration information specific to the terminal 200, as the terminal-specific configuration information of the second control channel. The configuration of the second control channel region will be described in detail later.

For example, when the terminal-specific configuration information of the second control channel is notified and the second control channel region is configured by the base station 100, the control channel processing unit 204 searches the control channel addressed to the terminal 200 which is mapped to the second control channel region. In this case, the control channel processing unit 204 may also search some of the first control channel region. For example, the control channel processing unit 204 may also search the cell-specific search space in the first control channel region. Further, when the terminal-specific configuration information of the second control channel is not notified, and the second control channel region is not configured, by the base station 100, the control channel processing unit 204 searches the control channel addressed to the terminal 200 which is mapped to the first control channel region.

Here, when searching the control channel addressed to the terminal 200 which is mapped to the second control channel region, the control channel processing unit 204 uses the terminal-specific reference signal in order to demodulate the possible control channel. Further, when searching the control channel addressed to the terminal 200 which is mapped to the first control channel region, the control channel processing unit 204 uses the cell-specific reference signal in order to demodulate the possible control channel.

Specifically, the control channel processing unit 204 performs sequential search by performing the demodulation and decoding process on all or some of control channel candidates which are obtained, based on the type of the control information, the position of the resource to which the control information is mapped, and the size of the resource to which the control information is mapped. The control channel processing unit 204 uses an error detection code (for example, cyclic redundancy check (CRC) code) added to the control information, as a method of determining whether or not the control information is the control information addressed to the terminal 200. Further, such a search method is also referred to as the blind decoding.

Further, when the control channel addressed to the terminal 200 is detected, the control channel processing unit 204 identifies the control information mapped to the detected control channel, and the control information is shared in the all terminals 200 (including the higher layer), and is used in various controls by the terminal 200 such as the reception process of the downlink data channel, the transmission process of the uplink data channel and the control channel, and the uplink transmission power control.

When control information including the allocation information of the downlink data channel is mapped to the detected control channel, the control channel processing unit 204 outputs the data channel which is de-mapped by the reception signal processing unit 202, to the data channel processing unit 205.

The data channel processing unit 205 performs a propagation path compensation process (filter process) using the propagation path estimation result which is input from the propagation path estimation unit 203, a layer demapping process, a demodulation process, a descrambling process, an error correction decoding process, and the like, on the data channel which is input from the control channel processing unit 204, and outputs the processed data channel to the higher layer 206. In addition, interpolation or averaging in the frequency direction and the time direction is performed on the resource element to which the terminal-specific reference signal is not mapped, based on the resource element to which the terminal-specific reference signal is mapped, and the propagation path estimation is performed. In the propagation path compensation process, the propagation path compensation is performed on the input data channel, by using the estimated propagation path estimation value, and signals for each layer based on the information data are detected (restored). It is possible to use equalization of zero forcing (ZF) norm and minimum mean square error (MMSE) norm, turbo equalization, interference removal, and the like, as the detection method. In the layer demapping process, signals of each layer are demapped to each information data. The following processes are performed for each information data. In the demodulation process, demodulation is performed based on the used modulation scheme. In the descrambling process, the descrambling process is performed based on the used scrambling code. In the decoding process, the error correction decoding process is performed based on the applied coding method.

Figure 3:
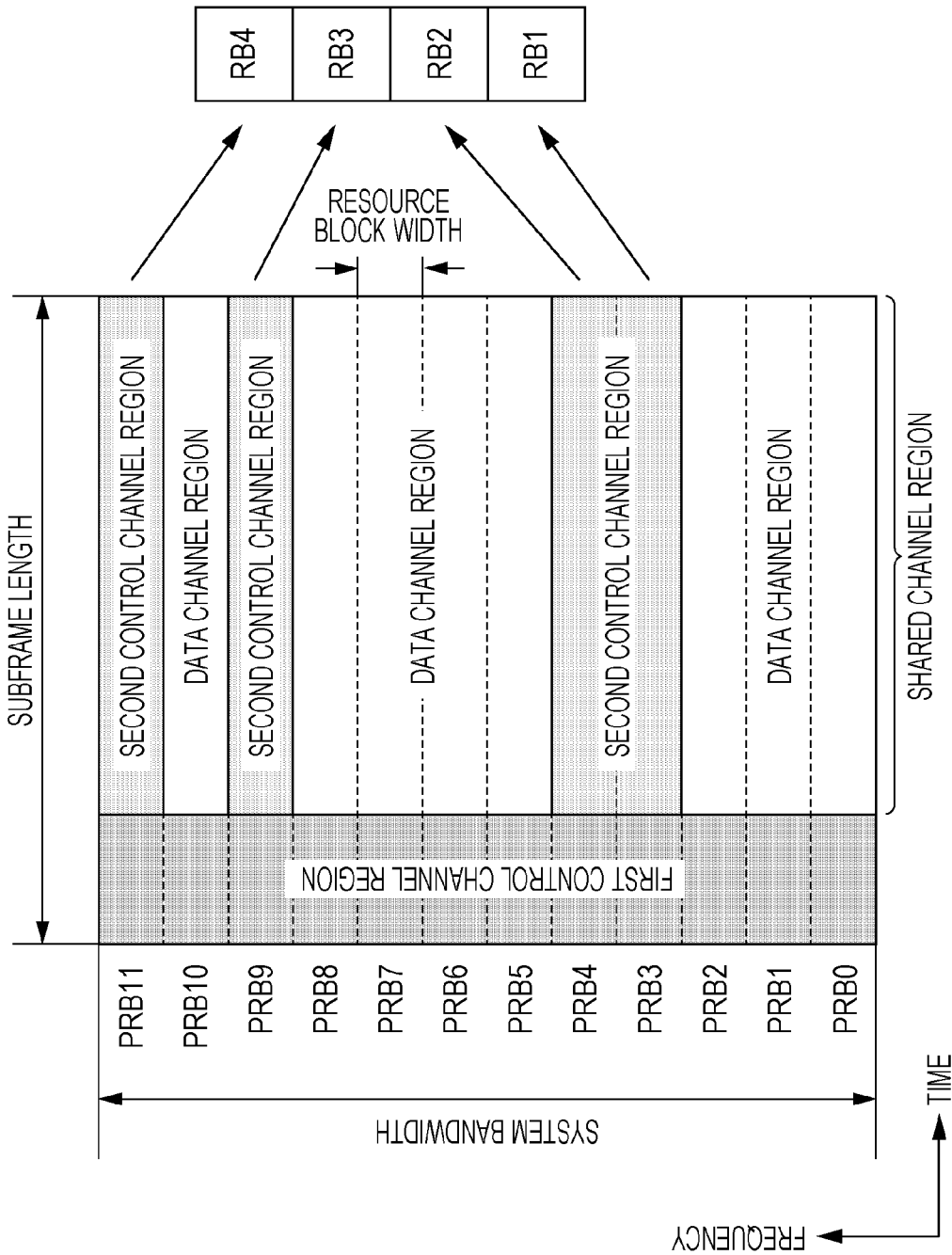
FIG. 3 is a diagram illustrating an example of a subframe which is transmitted by the base station 100 according to the first embodiment of the present invention.

FIG. 3 is a diagram illustrating an example of a subframe which is transmitted by the base station 100. In this example, one subframe of a system bandwidth configured with 12 physical resource block (PRB) pairs. In addition, in the following description, the resource block pair is simply described as a resource block, a PRB, or a RB. In other words, in the following description, the resource block, PRB or RB includes resource block pairs. Further, in the subframe, first zero or more OFDM symbols are the first control channel region. The terminal 200 is notified of the number of OFDM symbols of the first control channel region. For example, in the first control channel region, it is possible to configure dedicated regions in OFDM symbols in the beginning, and notify each subframe of the dedicated region. Further, it is possible to transmit the first control channel region by using the control information of the higher layer, in a quasi-static manner. Further, regions other than the first control channel region are shared channel region. The shared channel region is configured to include a data channel region and/or a second control channel region. In the example of FIG. 3, a PRB 3, a PRB 4, a PRB 9, and a PRB 11 are second control channel regions.

Here, the base station 100 notifies (configures) the terminal 200 of the second control channel region, through the control information of the higher layer. For example, the control information for configuring the second control channel region is control information to be configured for each PRB pair or each PRB pair group. In the example of FIG. 3, the PRB 3, the PRB 4, the PRB9, and the PRB 11 are configured as the second control channel regions. Further, the second control channel region is allocated in units of a predetermined number of PRBs. For example, the predetermined number of PRBs may be four. In this case, the base station 100 configures the PRBs of multiples of 4 as the second control channel region, in the terminal 200.

Figure 4:
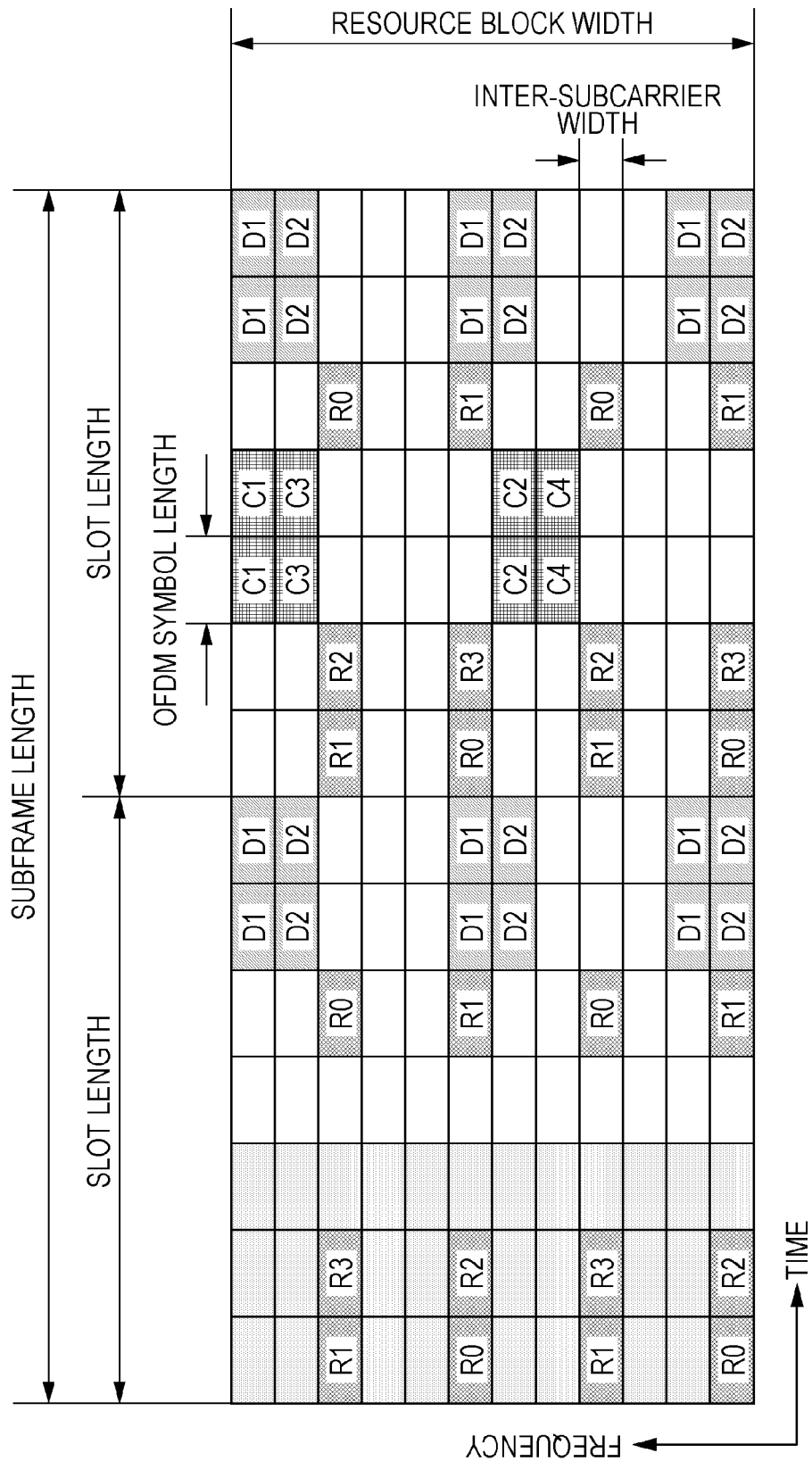
FIG. 4 is a diagram illustrating an example of one resource block pair which is mapped by the base station 100 according to the first embodiment of the present invention.

FIG. 4 is a diagram illustrating an example of one resource block pair which is mapped by the base station 100. One resource block is configured with a predetermined region in the frequency direction and a predetermined region in the time direction. One resource block pair includes two resource blocks which are continuously located in the time direction. Further, in the resource block pair, the resource blocks of the first half in the time direction are referred to as a first resource block, and the resource blocks of the second half in the time direction are referred to as a second resource block. FIG. 4 represents one resource block pair, and one resource block is configured with 12 subcarriers in the frequency direction and 7 OFDM symbol in the time direction. The resource configured with one OFDM symbol and one subcarrier is referred to as a resource element. The resource block pairs are arranged in the frequency direction, and the number of the resource block pairs can be set depending on the number of base stations. For example, the number of the resource block pairs may be set to 6 to 110. In this case, the width in the frequency direction is referred to as the system bandwidth. Further, the time direction of the resource block pair is referred to as a subframe. Among respective subframes, 7 continuous OFDM symbols in the time direction are referred to as a slot. Further, in the following description, the resource block pair is also simply referred to as a resource block.

In FIG. 4, among shaded resource elements, R0 to R3 respectively represent the cell-specific reference signals of the antenna ports 0 to 3. Hereinafter, the cell-specific reference signals of the antenna ports 0 to 3 are referred to as common reference signals (CRS). Here, the CRSs illustrated in FIG. 4 are for the case of having four antenna ports, but the number may be changed, for example, it is possible to map the CRSs of one antenna port or two antenna ports. Further, the cell-specific reference signal may be shifted in the frequency direction, based on the cell ID. For example, the cell-specific reference signal may be shifted in the frequency direction, based on the remainder obtained by dividing the cell ID by 6. The shift pattern at that time is 6. In other words, when the number of antennas of the cell-specific reference signal is 1, the pattern of the resource element used in the cell-specific reference signal is 6. When the number of antenna ports of the cell-specific reference signal is 2 and 4, the pattern of the resource element used in the cell-specific reference signal is 3.

In FIG. 4, it is possible to map the cell-specific reference signals of the antenna ports 15 to 22, as cell-specific reference signals different from the cell-specific reference signals of the antenna ports 0 to 3. Hereinafter, the cell-specific reference signals of the antenna ports 15 to 22 are referred to as channel state information reference signals (CSI-RS). In FIG. 4, among the shaded resource elements, C1 to C4 respectively represent channel state information reference signals of a code division multiplexing (CDM) group 1 to a CDM group 4. Orthogonal codes using a Walsh code are first mapped to and thereafter the scrambling codes using a Gold code are superimposed on the channel state information reference signal. Further, the channel state information reference signals are respectively code division multiplexed by orthogonal codes such as Walsh codes in the CDM group. Further, the channel state information reference signals are frequency division multiplexed (FDM) to each other, between the CDM groups. Further, the channel state information reference signals of the antenna ports 15 and 16 are mapped to C1, the channel state information reference signals of the antenna ports 17 and 18 are mapped to C2, the channel state information reference signals of the antenna ports 19 and 20 are mapped to C3, and the channel state information reference signals of the antenna ports 21 and 22 are mapped to C4. Further, the channel state information reference signals can be configured as the reference signals corresponding to eight antenna ports 15 to 22. Further, the channel state information reference signals can be configured as the reference signals corresponding to four antenna ports 15 to 18. Further, the channel state information reference signals can be configured as the reference signals corresponding to two antenna ports 15 and 16. Further, the channel state information reference signal can be configured as the reference signal corresponding to one antenna port 15. Further, the channel state information reference signals can be mapped to some subframes, for example, a plurality of respective subframes. Further, the resource elements to which the channel state information reference signals are mapped may be different from the resource elements illustrated in FIG. 4. Further, a plurality of patterns may be pre-defined for the mapping patterns for the resource elements of the channel state information reference signals. Further, the base station 100 can configure a plurality of channel state information reference signals for the terminal 200. Further, transmission power can be set for the channel state information reference signal and, for example, the transmission power may be zero. The base station 100 configures the channel state information reference signal, as the terminal-specific reference signal for the terminal 200, through the RRC signaling. The terminal 200 generates feedback information, by using the CRS and/or the channel state information reference signal, based on the configuration from the base station 100.

In FIG. 4, among shaded resource element, D1 to D2 respectively represent terminal-specific reference signals (DM-RS; demodulation-reference signal) of the code division multiplexing (CDM) group 1 and the CDM group 2. Orthogonal codes using a Walsh code are first mapped to and thereafter a pseudo-random sequence using Gold code as the scrambling sequences are superimposed on the channel state information reference signal. Further, the terminal-specific reference signals are respectively code division multiplexed by orthogonal codes such as Walsh codes in the CDM group. Further, the terminal-specific reference signals are subjected to FDM to each other, between CDM groups. Here, the terminal specific reference signal may be mapped to up to eight ranks, in response to the control channels and the data channels which are mapped to the resource block pairs, by using eight antenna ports (antenna ports 7 to 14). Further, with respect to the terminal-specific reference signal, the spreading code length of CDM and the number of resource elements to be mapped can be varied, depending on the number of ranks to be mapped.

For example, when the number of ranks is 1 or 2, the terminal-specific reference signals have a spreading code length of two chips, with the antenna port as 7 or 8, and are mapped to the CDM group 1. When the number of ranks is 3 or 4, the terminal-specific reference signals have a spreading code length of two chips, with the antenna port as 9 or 10 in addition to the antenna port 7 or 8, and are mapped to the CDM group 2. When the number of ranks is 5 to 8, the terminal-specific reference signals have a spreading code length of four chips, with the antenna ports as 7 to 14, and are mapped to the CDM group 1 and the CDM group 2.

Here, the terminal-specific reference signals may have different antenna port numbers and configurations, according to the associated channels (signal). For example, the antenna ports 7 to 14 may be used as the antenna port numbers of the terminal-specific reference signals associated with the shared channels (PDSCH). The antenna ports 107 to 114 may be used as the antenna port numbers of the terminal-specific reference signals associated with the second control channels (ePDCCH). In addition, the antenna ports 107 to 110 may be used as the antenna ports of the terminal-specific reference signals associated with the second control channels (ePDCCH). Here, the antenna ports 107 to 114 are configured similarly to the antenna ports 7 to 14. Further, the terminal-specific reference signals of the antenna ports 107 to 114 may be configured to be different from the terminal-specific reference signals of the antenna ports 7 to 14 in some parts. For example, the scrambling sequence of the terminal-specific reference signals used in the antenna ports 107 to 114 may be different from the scrambling sequence of the terminal-specific reference signals used in the antenna ports 7 to 14.

Further, white resource elements represent regions in which the shared channels and/or the second control channels are disposed (shared channel region). The shared channel regions are OFDM symbols in the rear part of the subframe, that is, the shared channel regions are mapped to the OFDM symbols other than the OFDM symbols in which the first control channels are disposed, in the subframe, and it is possible to configure a predetermined number of OFDM symbols for each subframe. In addition, all or some of the shared channel regions can also be mapped to a predetermined fixed OFDM symbols, regardless of the first control channel regions in the subframe. Further, the regions in which the shared channels are disposed can be configured for each resource block pair. Further, the second control channel regions may be configured with all OFDM symbols, regardless of the number of OFDM symbols in the first control channel region.

Here, the number of resource blocks may be changed depending on the frequency bandwidth (system bandwidth) used by the communication system. For example, it is possible to use 6 to 110 resource blocks, and the unit is also referred to as a component carrier. Further, the base station 100 can configure a plurality of component carriers by frequency aggregation for the terminal 200. For example, the base station 100 can configure one component carrier as 20 MHz, configure continuous and/or discontinuous five component carriers in the frequency direction, and set the total bandwidths that can be used by the communication system as 100 MHz, for the terminal 200.

Here, in the wireless communication system according to the present embodiment, the aggregation of a plurality of serving cells (simply, also referred to as cell) (referred to as the carrier aggregation) in downlink and uplink are supported. For example, it is possible to use the transmission bandwidth of up to 110 resource blocks in each of the serving cells. Further, in the carrier aggregation, one serving cell is defined as a primary cell (PCell). Further, in the carrier aggregation, serving cells other than the primary cell are defined as secondary Cells (SCell).

In addition, the carriers corresponding to the serving cell in downlink are defined as downlink component carriers (DLCO). Further, the carriers corresponding to the primary cell in downlink are defined as downlink primary component carriers (DLPCC). Further, carriers corresponding to the secondary cell in downlink are defined as downlink secondary component carriers (DLSCC).

Further, the carriers corresponding to the serving cell in uplink are defined as uplink component carriers (ULCC). Further, the carriers corresponding to the primary cell in uplink are defined as uplink primary component carriers (ULPCC). Further, carriers corresponding to the secondary cell in uplink are defined as uplink secondary component carriers (ULSCC).

In other words, in the carrier aggregation, a plurality of component carriers are aggregated in order to support a wide transmission bandwidth. Here, for example, if the primary cell is assumed as a primary base station, the secondary base station is considered as a secondary cell (configured by the base station 100 to the terminal 200) (also referred to as HetNet deployment with a carrier aggregation).

Hereinafter, the configuration of the PDCCH will be described in detail. The PDCCH is configured with a plurality of control channel elements (CCE). The number of CCEs used in each downlink component carrier is dependent on the downlink component carrier bandwidth, the number of OFDM symbols constituting the PDCCH, and the number of transmission antenna ports of the cell-specific reference signals in downlink according to the number of transmission antennas of the base station 100 used in communication. The CCE is configured with a plurality of downlink resource elements (resource that is defined by one OFDM symbol and one subcarrier).

The number for identifying the CCE is assigned to the CCE used between the base station 100 and the terminal 200. The numbering of CCE is performed according to a predetermined rule. Here, CCE_t represents the CCE of CCE number t. The PDCCH is configured with an aggregation including a plurality of CCEs (CCE aggregation). The number of CCEs constituting the aggregation is referred to as "CCE aggregation level". The CCE aggregation level constituting the PDCCH is set by the base station 100 according to the coding rate which is set to PDCCH, the number of bits of the DCI included in the PDCCH. In addition, the combination of the CCE aggregation levels that may be used for the terminal 200 is predetermined. Further, the aggregation configured with n CCEs is referred to as "CCE aggregation level n".

One resource element group (REG) is configured with four adjacent downlink resource elements in the frequency region. In addition, one CCE is configured with nine different resource element groups which are dispersed in the frequency region and the time region. Specifically, interleaving is performed in a resource element group unit on the entire downlink component carrier, by using a block interleaver for all resource element groups which are numbered, and one CCE is configured with nine interleaved resource element groups of continuous numbers.

A search space (SS) which is a region for searching PDCCH is configured for each terminal. The SS is configured with a plurality of CCEs. The SS is configured with a plurality of CCEs of the continuous numbers from the smallest number of CCE, and the number of the plurality of CCEs of the continuous numbers is pre-defined. The SS of each CCE aggregation level is configured with aggregation of a plurality of PDCCH candidates. The SS is classified into a cell-specific SS (CSS) in which numbers from the smallest CCE are common in a cell, and a UE-specific SS (USS) in which numbers from the smallest CCE are specific to a terminal. PDCCH to which control information such as system information or information about paging, which is read by a plurality of terminals, is allocated, or PDCCH to which a downlink/uplink grant indicating an instruction of fallback and random access to a lower transmission scheme is allocated can be disposed in the CSS.

The base station 100 transmits PDCCH by using one or more CCEs in the SS which is configured in the terminal 200. The terminal 200 decodes reception signal by using one or more CCEs in the SS, and performs a process for detecting the PDCCH addressed to the base station 100 (referred to as blind decoding). The terminal 200 configures different SS for each CCE aggregation level. Thereafter, the terminal 200 performs blind decoding by using a predetermined combination of CCEs in a different SS for each CCE aggregation level. In other words, the terminal 200 performs blind decoding for each PDCCH in a different SS for each CCE aggregation level. This series of processes in the terminal 200 is referred to as PDCCH monitoring.

The second control channel (E-PDCCH, PDCCH on PDSCH, or Enhanced PDCCH) is mapped to the second control channel region. When the base station 100 notifies the terminal 200 of the control channel through the second control channel region, the base station 100 configures a second control channel monitoring for the terminal 200, and maps the control channel for the terminal 200 to the second control channel region. Further, when the base station 100 notifies the terminal 200 of the control channel through the first control channel region, the base station 100 may map the control channel for the terminal 200 to the first control channel region regardless of the configuration of the second control channel monitoring for the terminal 200. Further, when the base station 100 notifies the terminal 200 of the control channel through the first control channel region, the base station 100 may map the control channel for the terminal 200 to the first control channel region, when the base station 100 does not configure the second control channel monitoring for the terminal 200.

Meanwhile, when the second control channel monitoring is configured by the base station 100, the terminal 200 performs blind decoding on the control channel addressed to the terminal 200 in the first control channel region and/or the control channel addressed to the terminal 200 in the second control channel region. Further, when the second control channel monitoring is not configured by the base station 100, the terminal 200 does not perform blind decoding on the control channel addressed to the terminal 200 in the first control channel region.

Hereinafter, the control channel (E-PDCCH) which is mapped to the second control channel region will be described in detail.

The base station 100 configures a second control channel region (potential E-PDCCH) in the terminal 200. The second control channel region is configured with one or more RB pairs. In other words, the second control channel region can be configured in units of RB pairs. Here, the number of RB pairs constituting the second control channel region can be set to multiples of a predetermined value. For example, the number of RB pairs constituting the second control channel region can be set to multiples of 4. In other words, the second control channel region is configured, with the RB pair of which the number is multiples of 4 as a unit. Further, for example, the number of RB pairs constituting the second control channel region can be set to multiples of 2. In other words, the second control channel region is configured, with the RB pair of which the number is multiples of 2 as a unit. Further, the base station 100 can configure a search space in the second control channel region which is set in the terminal 200. Here, the search space of the second control channel region can be configured, with the RB pair of which the number is multiples of a predetermined value as a unit. For example, the unit of the RB pair for configuring the search space in the second control channel region can be set to multiples of 4. In other words, the search space in the second control channel region is configured, with the RB pair of which the number is multiples of 4 as a unit. Further, for example, the unit of the RB pair for configuring the search space in the second control channel region can be set to multiples of 2. In other words, the search space in the second control channel region is configured, with the RB pair of which the number is multiples of 2 as a unit.

The base station 100 maps the E-PDCCH for the terminal 200 to the search space in the second control channel region. Further, the base station 100 allows a plurality of terminals to share all or some of the second control channel region and/or the search space. In other words, a plurality of E-PDCCHs for a plurality of terminals can be multiplexed in the second control channel region. Here, the E-PDCCH is constituted by a plurality of enhanced control channel elements (E-CCE; enhanced CCE), and/or enhanced resource element groups (E-REG; enhanced REG). Here, the E-CCE is a unit constituting the control channel, and is constituted by one or more resource elements or E-REGs. Further, the E-REG is constituted by one or more resource elements. Further, the E-CCE is also referred to as eCCE. The E-REG is also referred to as eREG. The E-PDCCH is also referred to as ePDCCH.

The second control channel region is configured with a plurality of E-CCEs. The number of E-CCE in the second control channel region is defined as a predetermined value. Further, the number of E-CCE in the second control channel region may be implicitly determined by control information about the second control channel which is configured by the base station 100. For example, the number of E-CCE in the second control channel region may be determined by the number of PRB of the second control channel which is configured by the base station 100. Further, the number of E-CCE in the second control channel region may be explicitly determined by control information about the second control channel which is configured by the base station 100.

Further, the E-CCE is configured with one or more enhanced resource element group (E-REG). Here, the E-REG is used to define the resource for mapping the control channel to the resource element. Further, the E-REG is configured with one or more resource elements in one RB pair. In addition, the E-REG may be configured with a plurality of resource elements over a plurality of RB pairs. For example, the E-REG may be configured with a plurality of resource elements in the plurality of RB pairs in the second control channel region. Further, for example, the E-REG may be configured with the plurality of resource elements in the plurality of RB pairs constituting the E-CCE. The number of E-REGs constituting one E-CCE is a predetermined value. Further, the number of E-REGs constituting one E-CCE may be implicitly determined by control information about the second control channel that is configured by the base station 100. For example, the number of E-REGs constituting one E-CCE may be determined by a mapping method (for example, localized mapping or distributed mapping) of the second control channel region that is configured by the base station 100. Further, for example, the number of E-REGs constituting one E-CCE may be determined by a mapping method of the E-CCE and the terminal-specific reference signal (mapping (association) method of E-CCE and antenna port) that is configured by the base station 100. Further, the number of E-REGs constituting one E-CCE may be explicitly determined by control information about the second control channel that is configured by the base station 100.

Here, in the RB pair, a plurality of mapping rules (mapping method, association) of E-REG and E-CCE are defined. One mapping method of E-REG and E-CCE is a distributed mapping (distributed mapping rule). In the distributed mapping rule, E-REG and E-CCE can be mapped so as to be distributed in a plurality of RB pairs. In the case of the distributed mapping, some or all of the E-REG constituting each E-CCE can be mapped to E-REG in a plurality of RB pairs. Further, in the case of the distributed mapping, some or all of the E-REG constituting the RB pair can be mapped from E-REG in a plurality of E-CCE. Further, one of the mapping methods of E-REG constituting the RB pair and E-REG constituting E-CCE is localized mapping (localized mapping rule). In the localized mapping rule, each E-CCE can be locally mapped to one RB pair or to a plurality of RB pairs that are consecutively disposed in the frequency direction. In the case of the localized mapping, all E-REG constituting the E-CCE can be mapped to E-REG in one RB pair. Further, in the case of the localized mapping, some or all of the E-REG constituting the RB pair can be mapped from all of the E-REG in a plurality of RB pairs which are consecutively disposed in the frequency direction. In addition, in the localized mapping and/or the distributed mapping, the case where each of the E-CCE is configured with one or more E-REG is described, but the case where each of E-CCE is configured with one or more RB pairs, without the E-REG being defined, will be applied similarly.

Further, the number of E-REGs constituting one RB pair is defined as a predetermined value. Further, the number of E-REGs constituting one RB pair may be implicitly determined by control information about the second control channel that is configured by the base station 100. For example, the number of E-REGs constituting one RB pair may be determined by a mapping method (for example, localized mapping or distributed mapping) of the second control channel region that is configured by the base station 100. Further, for example, the number of E-REGs constituting one RB pair may be determined by a mapping method (mapping method of E-CCE and antenna port) of the E-CCE and the terminal-specific reference signal that is configured by the base station 100. Further, the number of E-REGs constituting one E-CCE may be explicitly determined by control information about the second control channel that is configured by the base station 100.

From the above, the mapping method by the base station 100 to the PRB pair of the E-PDCCH for the terminal 200 is as follows. First, E-PDCCH is mapped to one or a plurality of E-CCE. Next, in the case of the distributed mapping, a plurality of E-REG constituting E-CCE are mapped to E-REG in a plurality of RB pairs. Further, in the case of the localized mapping, a plurality of E-REG constituting E-CCE are mapped to E-REG in a plurality of RB pairs which are continuously disposed in the frequency direction. Next, a plurality of RB pairs, to which E-REG is mapped, are mapped to some or all of the plurality of PRB pairs constituting the second control channel region.

Here, various methods can be used for the numbering of the RB pairs used as the second control channel region. The numbering of the RB pairs used as the second control channel region is performed according to a pre-defined rule. For example, the number of RB pairs used as the second control channel region may be set in an ascending order of the frequency.

Meanwhile, a method of recognizing E-CCE by which the terminal 200 detects the E-PDCCH notified from the base station 100 is as follows. First, the terminal 200 recognizes the PRB pair of the second control channel region which is configured by the base station 100 as the RB pair used as the second control channel region. Next, the terminal 200 recognizes E-REG or resource elements constituting the E-CCE in each of the RB pair used as the second control channel region. Next, the terminal 200 recognizes the E-CCE, based on the recognized E-REG or resource element, according to whether the E-PDCCH is subjected to the localized mapping or the distributed mapping. Further, the terminal 200 performs detection process (blind decoding) of E-PDCCH, based on the recognize E-CCE. The method described later is used as the detection processing method of E-PDCCH.

Hereinafter, the configuration of E-REG for a RB pair will be described in detail. The number for identifying the E-REG is assigned to the E-REG which is used between the base station 100 and the terminal 200. The numbering of E-REG is performed according to a predetermined rule. It is possible to use various methods as the rules used in the numbering of E-REG. Further, E-REG numbers constituting one RB pair can be used in common in the distributed mapping and the localized mapping. Further, the numbering of E-REG is preferably performed in consideration of each of the distributed mapping and the localized mapping.

Here, in the numbering of E-REG, the resource elements may be numbered as they are (by puncturing) to which the terminal-specific reference signal, the cell-specific reference signal, the channel state information reference signal, and/or the broadcast channel are mapped. In other words, the numbering of E-REG is performed over all resource elements in the RB pair, without being dependent on the signals to be mapped to the resource elements. The terminal 200 recognizes that the control channels are not mapped to the resource elements to which the terminal-specific reference signal, the cell-specific reference signal, the channel state information reference signal, and/or the broadcast channel are mapped. Thus, since the definition of the E-REG is determined as being independent of the signals to be mapped to the resource elements, it is possible to reduce the process and storage capacity in the base station 100 and the terminal 200.

Here, in the numbering of E-REG, the resource elements may be numbered as they are (by puncturing) to which the cell-specific reference signal, the channel state information reference signal, and/or the broadcast channel are mapped. Further, the numbering of the E-REG is performed in consideration of only the resource elements to which the terminal-specific reference signals are mapped. For example, the numbering of the E-REG is performed by jumping (rate matching) the resource elements to which the terminal-specific reference signals are mapped. In other words, the numbering of the E-REG is performed over all resource elements in the RB pair, without being dependent on the signals to be mapped to the resource elements, except for the terminal-specific reference signals. The terminal 200 recognizes that the control channels are not mapped to the resource elements to which the terminal-specific reference signal, the cell-specific reference signal, the channel state information reference signal, and/or the broadcast channel are mapped. Thus, since the definition of the E-REG is determined as being independent of the signals to be mapped to the resource elements except for the terminal-specific reference signal, it is possible to reduce the process and storage capacity in the base station 100 and the terminal 200. Further, when the second control channel is demodulated by using the terminal-specific reference signal, the terminal-specific reference signal is mapped to the RB pair to which the second control channel is mapped. Therefore, it is possible to map the second control channel in view of the resource overhead due to the terminal-specific reference signal.

Here, the numbering of the E-REG may be performed by jumping (rate matching) the resource elements to which the terminal-specific reference signal, the cell-specific reference signal, the channel state information reference signal, and/or the broadcast channel are mapped. In other words, the numbering of the E-REG is performed over all resource elements in the RB pair, except for the resource elements to which the terminal-specific reference signal, the cell-specific reference signal, the channel state information reference signal, and/or the broadcast channel are mapped. Therefore, it is possible to map the second control channel in view of the resource overhead due to the terminal-specific reference signal, the cell-specific reference signal, the channel state information reference signal, and/or the broadcast channel.

Each of the RB pairs in the second control channel region can be configured with a predetermined number of E-REG sets. It is possible to use a predetermined constitution for the E-REG set of the RB pair. Each E-REG set can be constituted by a predetermined number of E-REGs. It is possible to use a predetermined constitution for the E-REG in the E-REG set. Further, each E-REG can be independent of the RB pair. In addition, the constitution used in the following description may be expressed as association, mapping, allocation, and placement.

Further, in the following description, in each RB, the resource element indicated by the k-th subcarrier and the l-th OFDM symbol is represented as (k, l). An index (l=0, 1, . . . , 6) is assigned to each OFDM symbol in the time direction for seven OFDM symbols, in each slot of each RB pair. The index for an OFDM symbol is referred to as an OFDM symbol number. Further, an index (k=0, 1, . . . , 11) is assigned to each subcarrier in the frequency direction for 12 subcarriers, in each RB pair. The index for a subcarrier is referred to as a subcarrier number. In addition, the subcarrier number can be assigned continuously over the system bandwidth (component carrier). When for example, the subcarrier number (k−0=0, 1, . . . , 11) in each RB pair is assigned, the subcarrier number k in the system bandwidth is also expressed as NscRB×nRB+k0. Here, NscRB represents the subcarrier number in one RB or RB pair. nRB represents the index of the RB or the RB pair that can be assigned continuously over the system bandwidth (component carrier), nRB=0, 1, . . . , NRBDL−1. The index of the RB or the RB pair is referred to as the RB number or the RB pair number. Further, an index for a slot (slot number) is assigned to each slot. For example, even-numbered slot numbers are the slots (slot 0) in the first half of each subframe. Further, odd-numbered slot numbers are the slots (slot 1) in the second half of each subframe.

Each RB pair in the second control channel region can be configured with a predetermined number of E-REG sets. For example, each RB pair is configured with four E-REG sets. A predetermined configuration can be used for E-REG sets in the RB pair.

Figure 5:
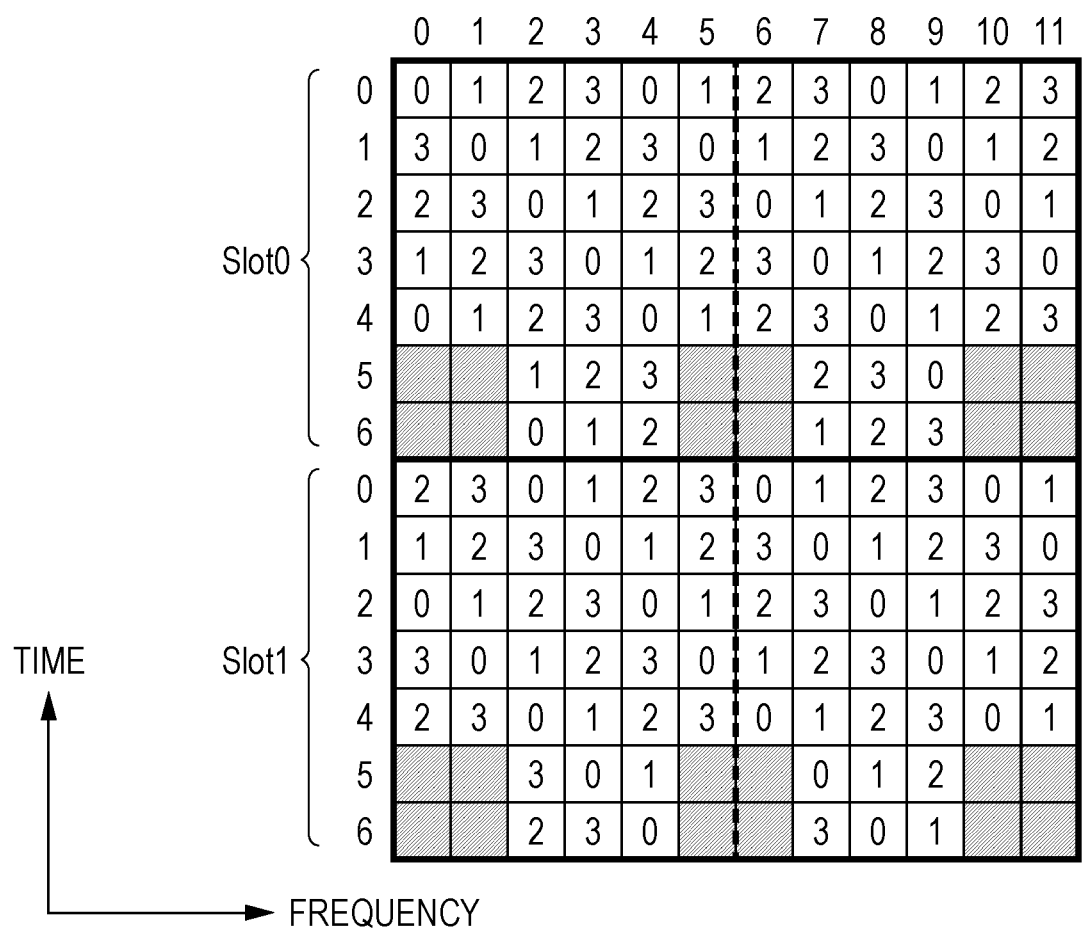
FIG. 5 is a diagram illustrating an example of a configuration of an E-REG set according to the first embodiment of the present invention.

FIG. 5 is a diagram illustrating an example of a configuration of an E-REG set. In FIG. 5, one RB pair is configured with four E-REG sets (E-REG set numbers 0 to 3). The number described in each of the resource elements is an E-REG set number. In other words, the resource element denoted by the each E-REG set number is used in the E-REG set of the E-REG set number. E-REG set can be configured by omitting predetermined resource elements in the RB pair. For example, the E-REG set can be configured by omitting the resource elements used for the terminal-specific reference signal, the cell-specific reference signal, the broadcast channel, and/or the first control channel region in the RB pair. In FIG. 5, the terminal-specific reference signals are mapped to the hatched resource elements. In other words, in the example of FIG. 5, the E-REG set is configured by omitting the resource elements used for the terminal-specific reference signal in the RB pair.

For example, resource elements for each of the E-REG sets are configured in order from the resource element of the smallest subcarrier number of the first OFDM symbol of the RB pair to the resource element of the larger subcarrier number of the same OFDM symbol. For example, in the second OFDM symbol of the RB pair, resource elements for each of the E-REG set are configured in a different order, in comparison with the first OFDM symbol. In the subsequent OFDM symbols, resource elements for each of the E-REG set are configured in the same order.

FIG. 6 is a diagram illustrating an example of a combination of resource elements for the E-REG set. FIG. 6 illustrates combinations of resource elements (k, l) of the slot 0 and the slot 1 for the configuration of the E-REG set illustrated in FIG. 5. In this example, respective E-REG sets are configured with 36 resource elements in the slot 0, and the slot 1. The E-REG set can be configured by various manners other than the configuration illustrated in FIG. 5 and FIG. 6.

Each E-REG sets can be configured with a predetermined number of E-REGs. For example, each E-REG set is configured with two or four E-REGs. For the E-REGs in the E-REG set, it is possible to use a predetermined configuration in the corresponding E-REG set. Further, each E-REG can be configured independently in the RB pair. For example, when one RB pair is configured with four E-REG sets, and one E-REG set is configured with four E-REGs, one RB pair is configured with 16 E-REGs. Further, for example, when one RB pair is configured with four E-REG sets, and one E-REG set is configured with two E-REGs, one RB pair is configured with eight E-REGs.

Here, an example of the configuration of E-REG in an E-REG set will be described. The combination of E-REGs corresponding to each E-REG set is configured. In addition, the configuration may be pre-defined or may be explicitly or implicitly notified. The E-REG constituting the E-REG set is configured with the resource elements constituting the E-REG set, by a predetermined method or procedure. A plurality of E-REGs constituting the E-REG set are arranged in a predetermined order, and the E-REGs are configured with resource elements constituting the E-REG set. For example, when the combination of the E-REGs constituting a certain E-REG set is E-REG X0, E-REG X1, E-REG X2, and E-REG X3, the combination is configured by repeating E-REG X0, E-REG X1, E-REG X2, and E-REG X3 in order, for the resource elements constituting the E-REG set. Further, when one E-REG set is associated with two RBs in one RB pair, a plurality of E-REGs constituting the E-REG set are configured in preference to the RBs corresponding to the slots having a smaller slot number or greater slot number. For example, a plurality of E-REGs in the same E-REG set are respectively configured in order from the RB corresponding to the slot having smaller slot number. Further, a plurality of E-REGs in the same E-REG set are respectively configured in a predetermined order, in the resource elements constituting the corresponding E-REG set. For example, a plurality of E-REGs which are arranged in a predetermined order are configured in order from the resource elements having a smaller or greater OFDM symbol number and/or subcarrier number, in the resource elements constituting the corresponding E-REG set. Further, in the configuration, the OFDM symbol number may be preferred to the subcarrier number. In other words, the configuration is performed in order with priority given to the resource elements having a smaller or greater OFDM symbol number. When there are a plurality of resource element candidates of the same OFDM symbol number, the configuration is performed in order from the resource elements having a smaller or greater subcarrier number. Further, in the configuration, the subcarrier number may be preferred to the OFDM symbol number. In other words, the configuration is performed in order with priority given to the resource elements having a smaller or greater subcarrier number. When there are a plurality of resource element candidates of the same subcarrier number, the configuration is performed in order from the resource elements having a smaller or greater OFDM symbol number.

FIG. 7 is a diagram illustrating an example of a combination of E-REGs for the E-REG set. FIG. 7 illustrates the combination of E-REG numbers constituting the E-REG set for each E-REG set number. In FIG. 7, one E-REG set is configured with four E-REGs. For example, the resource elements constituting E-REG set 0 are used for any of E-REGs 0 to 3. Further, the resource elements constituting E-REG set 1 are used for any of E-REGs 4 to 7. Further, the resource elements constituting E-REG set 2 are used for any of E-REGs 8 to 11. Further, the resource elements constituting E-REG set 4 are used for any of E-REGs 12 to 15.

Figure 8:
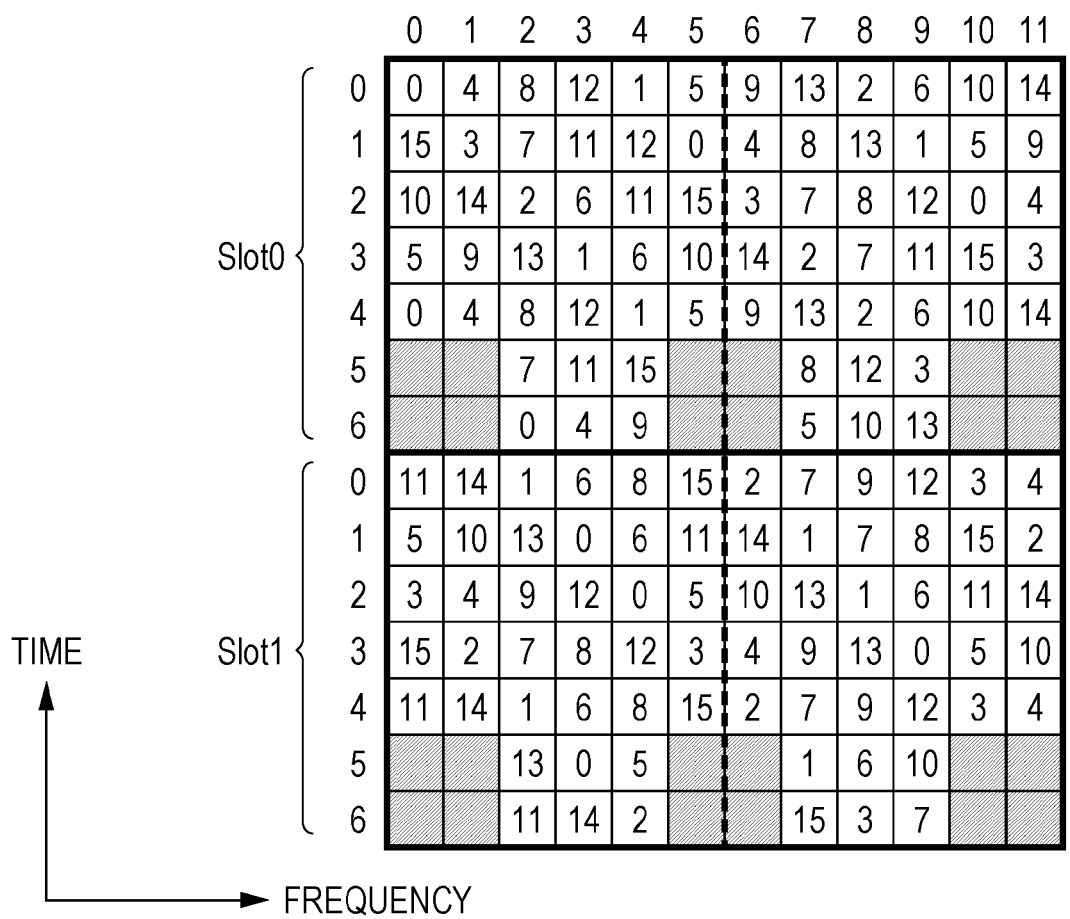
FIG. 8 is a diagram illustrating an example of a configuration of an E-REG according to the first embodiment of the present invention.

FIG. 8 is a diagram illustrating an example of a configuration of an E-REG. In FIG. 8, one RB pair is configured with 16 E-REGs (E-REG numbers 0 to 15). The number described in each of the resource elements is the E-REG number. In other words, the resource element denoted by the each E-REG number is used in the E-REG of the E-REG number. The terminal-specific reference signals are mapped to the resource elements which are hatched. In addition, E-REG can be configured by omitting predetermined resource elements in the RB pair or E-REG set. For example, the E-REG can be configured by omitting the resource elements used for the terminal-specific reference signal, the cell-specific reference signal, the broadcast channel, and/or the first control channel region in the RB pair or E-REG set.

E-REG illustrated in FIG. 8 is configured by using the configuration of the E-REG set illustrated in FIG. 5, and the combination of the E-REGs for the E-REG set illustrated in FIG. 7. Further, the configuration of the E-REG in each of the E-REG sets is repeatedly performed from the E-REG having a smaller E-REG number in order. In other words, the configuration of the E-REG in E-REG set 0 is performed repeatedly in the order of E-REG 0, E-REG 1, E-REG 2, and E-REG 3. Further, the configuration of the E-REG in E-REG set 1 is performed repeatedly in the order of E-REG 4, E-REG 5, E-REG 6, and E-REG 7. Further, the configuration of the E-REG in E-REG set 2 is performed repeatedly in the order of E-REG 8, E-REG 9, E-REG 10, and E-REG 11. Further, the configuration of the E-REG in E-REG set 3 is performed repeatedly in the order of E-REG 12, E-REG 13, E-REG 14, and E-REG 15. Further, in the configuration of E-REG in each of the E-REG sets, the OFDM symbol number is preferred to the subcarrier number. In other words, the configuration is performed with priority given to the resource element having the smaller OFDM symbol number in order. When there are a plurality of resource element candidates of the same OFDM symbol number, the configuration is performed from the resource element having a smaller subcarrier number in order.

FIG. 9 is a diagram illustrating an example of a combination of resource elements for the E-REG. FIG. 9 illustrates combinations of resource elements (k, l) of the slot 0 and the slot 1 for the configuration of the E-REG illustrated in FIG. 8. In this example, respective E-REGs are configured with nine resource elements in the slot 0 and the slot 1.

FIG. 10 is a diagram illustrating an example of a combination of E-REGs for the E-REG set. FIG. 10 illustrates the combination of E-REG numbers constituting the E-REG set for each E-REG set number. In FIG. 10, one E-REG set is configured with two E-REGs. For example, E-REG 0 or E-REG 1 is used as the resource elements constituting E-REG set 0. Further, the resource elements constituting E-REG set 1 is used for E-REG 2 or E-REG 3. Further, the resource elements constituting E-REG set 2 is used for E-REG 4 or E-REG 5. Further, the resource elements constituting E-REG set 4 is used for E-REG 6 or E-REG 7.

Figure 11:
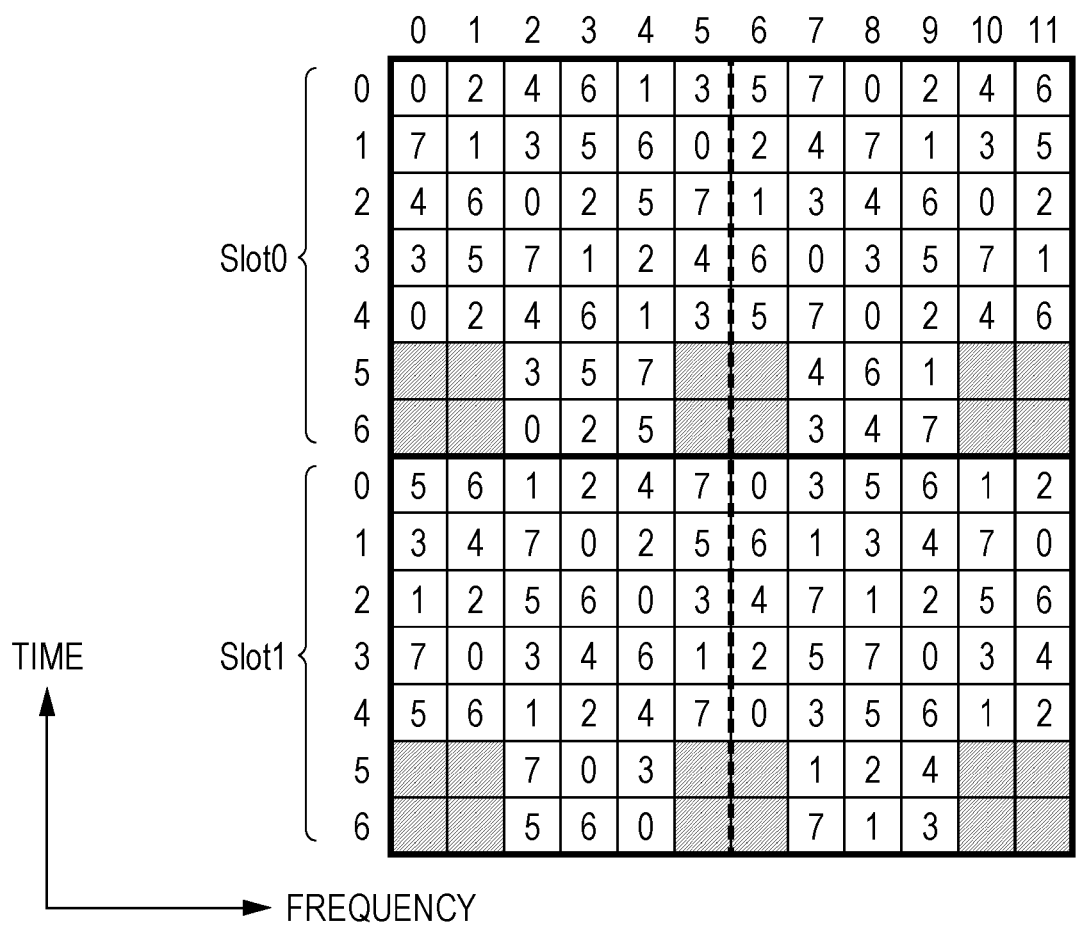
FIG. 11 is a diagram illustrating an example of a configuration of the E-REG according to the first embodiment of the present invention.
Figure 13:
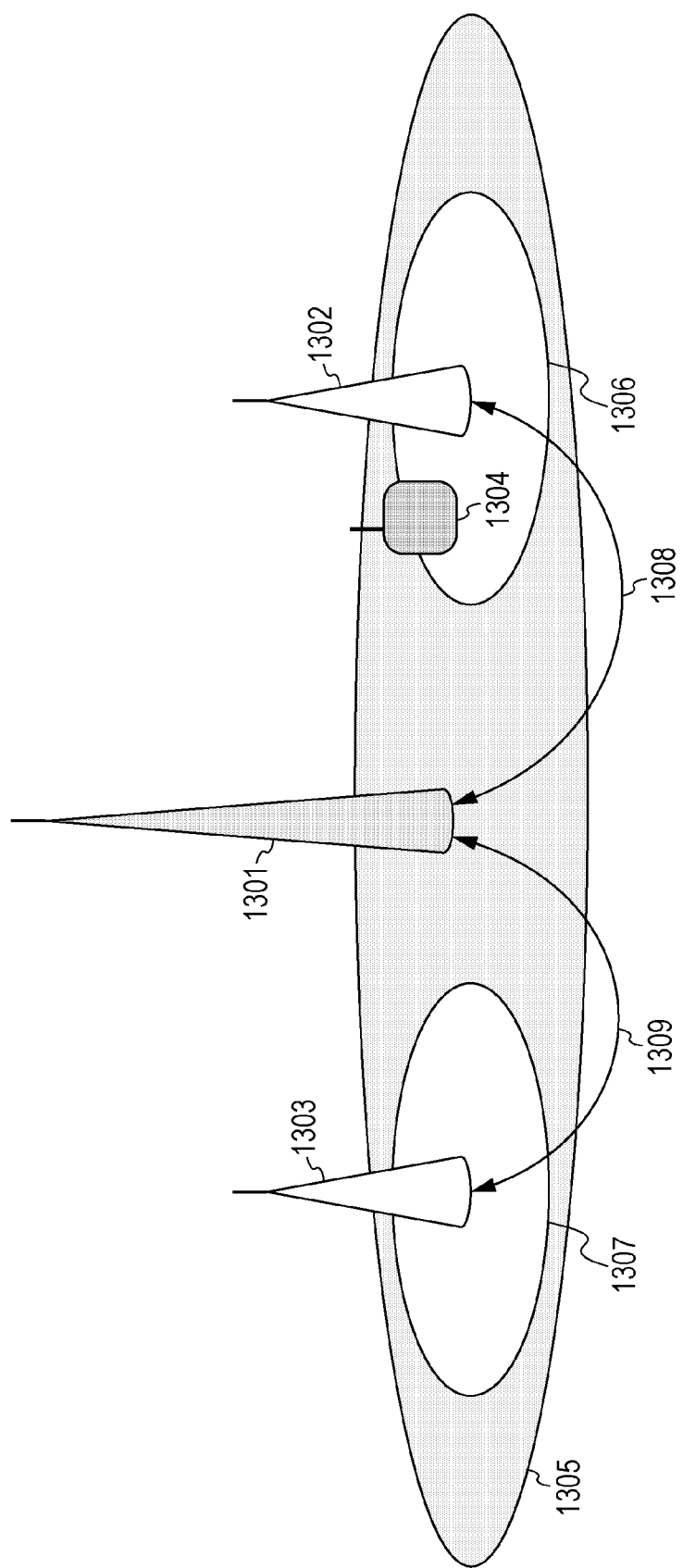
FIG. 13 is a schematic diagram of a wireless communication system using heterogeneous network deployment.

FIG. 11 is a diagram illustrating an example of a configuration of an E-REG. In FIG. 11, one RB pair is configured with eight E-REGs (E-REG numbers 0 to 7). The number described in each of the resource elements is the E-REG number. In other words, the resource element denoted by the each E-REG number is used in the E-REG of the E-REG number. The terminal-specific reference signals are mapped to the resource elements which are hatched. In addition, E-REG can be configured by omitting predetermined resource elements in the RB pair or E-REG set. For example, the E-REG can be configured by omitting the resource elements used for the terminal-specific reference signal, the cell-specific reference signal, the broadcast channel, and/or the first control channel region in the RB pair or E-REG set.

E-REG illustrated in FIG. 11 is configured by using the configuration of the E-REG set illustrated in FIG. 5, and the combination of the E-REGs for the E-REG set illustrated in FIG. 10. Further, the configuration of the E-REG in each of the E-REG sets is repeatedly performed from the E-REG having a smaller E-REG number in order. In other words, the configuration of the E-REG in E-REG set 0 is performed repeatedly in the order of E-REG 0 and E-REG 1. Further, the configuration of the E-REG in E-REG set 1 is performed repeatedly in the order of E-REG 2 and E-REG 3. Further, the configuration of the E-REG in E-REG set 2 is performed repeatedly in the order of E-REG 4 and E-REG 5. Further, the configuration of the E-REG in E-REG set 3 is performed repeatedly in the order of E-REG 6 and E-REG 7. Further, in the configuration of E-REG in each of the E-REG sets, OFDM symbol number is preferred to the subcarrier number. In other words, the configuration is performed with priority given to the resource element having the smaller OFDM symbol number in order. When there are a plurality of resource element candidates for the same OFDM symbol number, the configuration is performed from the resource element having a smaller subcarrier number in order.

FIG. 12 is a diagram illustrating an example of a combination of resource elements for the E-REG. FIG. 12 illustrates combinations of resource elements (k, l) of the slot 0 and the slot 1 for the configuration of the E-REG illustrated in FIG. 11. In this example, respective E-REGs are configured with 18 resource elements in the slot 0 and the slot 1.

The correspondence (mapping, configuration) between E-REG and E-CCE will be described later. Each E-CCE is configuration in a predetermined E-REG. For example, E-REGs constituting each E-CCE can be determined based on the E-REGs constituting E-REG set. Further, when the localized mapping is used, some or all of E-REGs constituting each E-CCE are E-REGs in the same RB pair. When the distributed mapping is used, some or all of E-REGs constituting each E-CCE are E-REGs in the different RB pairs.

For example, when the combinations of E-REGs corresponding to the E-REG set are the combinations illustrated in FIG. 7, one E-CCE is constituted by four E-REGs. In the case of using the localized mapping, a certain E-CCE is constituted by E-REGs 0 to 3 in the same RB pair. Another E-CCE is constituted by E-REGs 4 to 7 in the same RB pair. Another E-CCE is constituted by E-REGs 8 to 11 in the same RB pair. Another E-CCE is constituted by E-REGs 12 to 15 in the same RB pair. Further, in the case of using the distributed mapping, a certain E-CCE is constituted by E-REGs 0 to 3 in different RB pairs. Another E-CCE is constituted by E-REGs 4 to 7 in different RB pairs. Another E-CCE is constituted by E-REGs 8 to 11 in different RB pairs. Another E-CCE is constituted by E-REGs 12 to 15 in different RB pairs.

Further, for example, when the combinations of E-REGs corresponding to the E-REG set are the combinations illustrated in FIG. 10, one E-CCE is constituted by two E-REGs. In the case of using the localized mapping, a certain E-CCE is constituted by E-REG 0 and E-REG 1 in the same RB pair. Another E-CCE is constituted by E-REG 2 and E-REG 3 in the same RB pair. Another E-CCE is constituted by E-REG 4 and E-REG 5 in the same RB pair. Another E-CCE is constituted by E-REG 6 and E-REG 7 in the same RB pair. Further, in the case of using the distributed mapping, a certain E-CCE is constituted by E-REG 0 and E-REG 1 in different RB pairs. Another E-CCE is constituted by E-REG 2 and E-REG 3 in different RB pairs. Another E-CCE is constituted by E-REG 4 and E-REG 5 in different RB pairs. Another E-CCE is constituted by E-REG 6 and E-REG 7 in different RB pairs.

Further, the index of E-CCE (E-CCE number) can be applied using a predetermined method. For example, the E-CCE number is determined based on the RB number, the RB pair number, the E-REG number, and/or the slot number. Further, for example, the E-CCE number determined based on the RB pair number and the E-REG number in the second control channel region. The determination of the E-CCE number is performed in ascending order or descending order of the RB pair number and/or E-REG number in the second control channel region, and the RB pair number is preferred to the E-REG number, in the second control channel region.

Hereinafter, the association (mapping, correspondence) between the resource and the antenna port of the terminal-specific reference signal used for transmission of the second control channel will be described. As previously described, the base station 100 transmits the second control channel and the terminal-specific reference signal associated with the second control channel. Further, terminal 200 detects (demodulates) the second control channel by using the terminal-specific reference signal. Therefore, the resource used for transmission of the second control channel and the antenna port of the terminal-specific reference signal associated with the second control channel are associated by a predetermined method. Here, the resource used for transmission of the second control channel is the second control channel region, the second control channel, the E-REG, the E-REG set, or the E-CCE.

The association between the resource used for transmission of the second control channel and the antenna port of the terminal-specific reference signal is performed, based on the E-REG set number, the terminal-specific ID, the precoding, the RB number, the RB pair number, and/or the slot number. For example, the resource elements constituting the E-REG sets 0 and 2 are associated with the terminal-specific reference signal of the antenna port 107 or 108. The resource elements constituting the E-REG sets 1 and 3 are associated with the terminal-specific reference signal of the antenna port 109 or 110.

Further, the association between the resource used for transmission of the second control channel and the antenna port of the terminal-specific reference signal can be changed, based on the configuration about the second control channel. For example, the association between the resource used for transmission of the second control channel and the antenna port of the terminal-specific reference signal can be changed depending on whether the second control channel is subjected to the localized mapping or the distributed mapping.

Next, the effects of the E-REG structure, the E-REG set structure, and/or the E-CCE structure which are described above will be described. The first control channel, the cell-specific reference signal, the channel state information reference signal, the terminal-specific reference signal, the broadcast channel, the synchronization signal, and the like may be mapped (multiplexed) to the resource elements of the RB pairs used as the second control channel region. Specially, when the terminal-specific reference signal is used to detect (demodulate) the second control channel, some or all of the terminal-specific reference signals of the antenna ports 107 to 110 are mapped (multiplexed) to the RB pairs to which the second control channel is mapped. In addition, the first control channel, the cell-specific reference signal, the channel state information reference signal, the broadcast channel, and the synchronization signal may not be mapped to the resource elements of the RB pairs used as the second control channel region. Further, the terminal-specific reference signals of the CDM group 1 and the CDM group 2 are used in one RB pair to which the second control channel is mapped, as illustrated in FIG. 4, the number of resource elements to which the second control channel can be mapped is 144, except for the resource elements to which the terminal-specific reference signals are mapped.

When only terminal-specific reference signals of the CDM group 1 and the CDM group 2 are mapped in the E-REG set and the E-REG which are configured by using the above described method, the number of resource elements constituting each E-REG set is 36, and the number of resource elements constituting each E-REG is nine or 18. Further, when only terminal-specific reference signals of the CDM group 1 and the CDM group 2 are mapped, in the E-CCE configuration obtained based on the E-REG set structure and the E-REG structure, the number of resource elements constituting each E-CCE is 36. Here, the number of resource elements constituting each CCE used in the first control channel is 36. The number of resource elements constituting the E-CCE used for the second control channel and the number of resource elements constituting the CCE used for the first control channel are equal. Therefore, for the second control channel, it is possible to use the same transmission method, reception method, the signal process, and the like as that in the first control channel. In other words, since the transmission method, reception method, the signal process, and the like of the first control channel and the second control channel can be in common, it is possible to reduce the load of the base station 100 and the terminal 200.

Further, in the RB pair to which the second control channel is mapped, when the first control channel and/or the cell-specific reference signal are mapped, the number of resource elements to which the second control channel is mapped decreases. Here, when the number of resource elements to which the second control channel is mapped decreases, the variation in the number of resource elements between E-CCEs which are obtained based on the E-REG set structure and the E-REG structure of the present invention will be described. First, when the number of antenna ports of the cell-specific reference signal is 1 (antenna port 0), regardless of the number of the first control channels (0 to 3), the difference between the maximum value and the minimum value of the number of resource elements between E-CCEs is 1. Further, when the number of antenna ports of the cell-specific reference signal is 2 (antenna ports 0 and 1), regardless of the number of the first control channels (0 to 3), the difference between the maximum value and the minimum value of the number of resource elements between E-CCEs is 0, and there is no variation in the number of resource elements between E-CCEs. Further, when the number of antenna ports of the cell-specific reference signal is 4 (antenna ports 0 to 3), regardless of the number of the first control channels (0 to 3), the difference between the maximum value and the minimum value of the number of resource elements between E-CCEs is 0, and there is no variation in the number of resource elements between E-CCEs. In other words, by using the E-REG structure of the present invention, the variation in the number of resource elements between E-CCEs which are obtained based on the E-REG structure is suppressed, regardless of the possible combination of the first control channel region and the number of antenna ports of the cell-specific reference signal. Therefore, the size of the resource is almost unchanged due to the E-CCE used for the transmission of the second control channel. In other words, the difference between the transmission characteristics due to the coding gain for the second control channel becomes small, due to the E-CCE used for the transmission of the second control channel. Thus, it is possible to greatly reduce the load of the scheduling process when the base station 100 transmits the second control channel to the terminal 200.

Further, when the number of antenna ports of the cell-specific reference signal is 1 (antenna port 0), with respect to the RB pair to which the second control channel is mapped, the number of antenna ports of the cell-specific reference signal can be considered to 2 (antenna ports 0 and 1). In other words, when the number of antenna ports of the cell-specific reference signal which is transmitted by the base station 100 is 1 (antenna port 0), in a case of transmitting the second control channel to the terminal 200, the base station maps the second control channel, assuming that the number of antenna ports of the cell-specific reference signal is 2 (antenna ports 0, and 1). When the number of antenna ports of the cell-specific reference signal which is transmitted by the base station 100 is 1 (antenna port 0), when detecting the second control channel transmitted from the base station 100, the terminal 200 demaps the second control channel, assuming that the number of antenna ports of the cell-specific reference signal is 2 (antenna ports 0 and 1).

The E-REG set structure and the E-REG structure which are described above are examples, and are not limited thereto. In other words, the E-REG sets constituting one RB pair and E-REG constituting one E-REG set can be configured by using various methods (procedures). Hereinafter, methods or conditions for configuring the E-REG set in which the above described effect is achieved will be described. In the E-REG set structure, the number of resource elements for constituting each E-REG may be 36. Further, in the E-REG set structure, the variation in the number of resource elements between E-CCEs which are configured based on the E-REG set may be suppressed regardless of the possible combinations between the first control channel region and the number of antenna ports of the cell-specific reference signal.

A first method or condition for constituting the E-REG set in which the above described effect is achieved is that the number of resource elements for constituting each E-REG set, and/or the number of resource elements for constituting each E-REG are equal in the resource elements used in the first control channel region. For example, when first two OFDM symbols in one subframe are in the first control channel region, when viewed in one RB pair, the number of resource elements used as the first control channel region is 24. When the number of E-REG sets or the number of E-CCE constituting one RB pair is 4, each E-REG set or E-CCE is preferably configured to be every six resource elements in the first control channel region. Further, the E-REG set or the E-REG can be configured in common in all possible configurations of the first control channel region. For example, in each OFDM symbol that can be configured as the first control channel region, when the number of E-REG sets or the number of E-CCE constituting one RB pair is 4, each E-REG set or E-CCE is preferably configured to be every three resource elements.

A second method or condition for constituting the E-REG set in which the above described effect is achieved is that the number of resource elements for constituting each E-REG set, and/or the number of resource elements for constituting each E-REG are equal in the resource elements used in the cell-specific reference signal. For example, if the number of antenna ports of the cell-specific reference signal is 2, when viewed in one RB pair, the number of resource elements used for the cell-specific reference signal is 16. When the number of E-REG sets or the number of E-CCE constituting one RB pair is 4, each E-REG set or E-CCE is preferably configured to be every four resource elements in resource elements used for the cell-specific reference signal. Further, the E-REG set or the E-REG can be configured in common in all possible configurations for the number of antenna ports of the cell-specific reference signal. Further, the E-REG set or the E-REG can be configured in common in all possible configurations for shift in the frequency direction in the cell-specific reference signal.

Here, when the number of antenna ports of the cell-specific reference signal is 1, the combinations of the resource elements used for the cell-specific reference signal in one RB are <(s, 0), (s+6, 0), (s+3, 4), and (s+9, 4)>. When the number of antenna ports of the cell-specific reference signal is 2, the combinations of the resource elements used for the cell-specific reference signal in one RB are <(s, 0), (s+3, 0), (s+6, 0), (s+9, 0), (s, 4), (s+3, 4), (s+6, 4), and (s+9, 4)>. When the number of antenna ports of the cell-specific reference signal is 4, the combinations of the resource elements used for the cell-specific reference signal in one RB are <(s, 0), (s+3, 0), (s+6, 0), (s+9, 0), (s, 1), (s+3, 1), (s+6, 1), (s+9, 1), (s, 4), (s+3, 4), (s+6, 4), and (s+9, 4)>. Here, s=0, 1, 2, . . . , 5. Therefore, when the number of E-REG sets or the number of E-CCE constituting one RB pair is 4, each E-REG set or E-CCE is preferably configured to be every two resource elements in a predetermined eight resource elements used for the cell-specific reference signal. The predetermined eight resource elements are eight resource elements represented by <(s, 0), (s+6, 0), (s+3, 4), (s+9, 4)> in the slot 0 and <(s, 0), (s+6, 0), (s+3, 4), (s+9, 4)> in the slot 1, eight resource elements represented by <(s+3, 0), (s+9, 0), (s, 4), (s+6, 4)> in the slot 0 and <(s+3, 0), (s+9, 0), (s, 4), (s+6, 4)> in the slot 1, or eight resource elements represented by <(s, 1), (s+3, 1), (s+6, 1), (s+9, 1)> in the slot 0 and <(s, 1), (s+3, 1), (s+6, 1), (s+9, 1)> in the slot 1.

A third method or condition for constituting the E-REG set in which the above described effect is achieved is that the number of resource elements for constituting each E-REG set, and/or the number of resource elements for constituting each E-REG are equal in the resource elements other than the resource elements used in the first control channel region, the cell-specific reference signal, and the terminal-specific reference signal in the RB pair. Further, the E-REG set or the E-REG can be configured in common in all possible configurations for the first control channel region and the cell-specific reference signal. For example, the respective E-REG sets or E-CCE are preferably configured in resource elements of the same number, in resource elements other than all possible resource elements used in the first control channel region, the cell-specific reference signal, and the terminal-specific reference signal, in the RB pair.

The E-REG sets are configured by using the above first to third methods or conditions, but are not limited to using all methods or conditions. In other words, the effect is achieved even in a case where the E-REG sets are configured by using some of the above first to third methods or conditions.

Further, the E-REG set structure and the E-REG structure which are described above can use a plurality of patterns. The E-REG set structure and the E-REG structure in which a plurality of patterns are used can be changed based on given parameters and configurations. For example, the E-REG set structure in which a plurality of patterns are used can be used differently for each transmission point (base station, cell). Further, for example, a plurality of patterns in the E-REG set structure and the E-REG structure can be changed, based on a replacement pattern for arbitrarily replacing a predetermined resource element set in each RB pairs. Further, the base station 100 can explicitly notify the terminal 200 of the parameters for changing (determining, selecting, configuring) the patterns of the E-REG set structure and the E-REG structure through the RRC signaling or the PDCCH signaling. Further, the parameters for changing (determining, selecting, configuring) the patterns of the E-REG set structure and the E-REG structure can be implicitly determined, based on the other parameters and configurations. As described above, since it is possible to randomize the resources to each other used for transmission of the second control channel between the E-REG, the E-REG set, and the E-CCE of different patterns by using the E-REG set structure and the E-REG structure of a plurality of patterns, the transmission characteristics of the E-PDCCH is improved.

Hereinafter, the E-PDCCH will be described in detail. The control channel (E-PDCCH) to be mapped to the second control channel region is processed for each piece of control information for one or a plurality of terminals, and similarly to the data channel, the scrambling process, the modulation process, the layer mapping process, the precoding process, and the like are performed. Further, the control channel to be mapped to the second control channel region and the terminal-specific reference signal are subjected to the precoding process.

Hereinafter, a search space (SS) which is a region for searching (blind decoding) the second control channel of the terminal 200 will be described. The second control channel region is configured by the base station 100, and the terminal 200 recognizes a plurality of E-CCE in the second control channel region. Further, with respect to the terminal 200, the SS is configured by the base station 100. For example, with respect to the terminal 200, one E-CCE number is configured as a start E-CCE number (E-CCE number as a reference) which is recognized as the SS by the base station 100. The terminal 200 recognizes the SS specific to the terminal 200, based on the start E-CCE number and pre-defined rules. Here, the start E-CCE number is set by the control information which is uniquely notified to the terminal 200 from the base station 100. Further, the start E-CCE number may be determined based on the precoding which is configured uniquely to the terminal 200 from the base station 100. Further, the start E-CCE number may be determined based on the control information which is uniquely notified to the terminal 200 from the base station 100, and the precoding which is configured uniquely to the terminal 200 from the base station 100. Further, the start E-CCE number may be determined based on the subframe number which is numbered for each subframe, or the slot number which is numbered for each slot. Thus, the start E-CCE number is specific to the terminal 200, and information specific to each subframe or each slot. Therefore, SS of the terminal 200 can be configured so as to be different for each subframe or each slot. Further, it is possible to use various methods as a rule for recognizing the SS from the start E-CCE number.

It is possible to configure SS for searching the second control channel in the terminal 200, with one or more E-CCE. In other words, with the E-CCE in the region configured as the second control channel region as a unit, the SS is configured with the aggregation configured with one or more E-CCE (E-CCE Aggregation). The number of E-CCE constituting the aggregation is referred to as "E-CCE aggregation level". The SS is configured with a plurality of E-CCE of continuous numbers from the smallest E-CCE, and the number of one or more E-CCE of continuous numbers is predetermined. The SS of each E-CCE aggregation level is configured with an aggregation of a plurality of second control channel candidates. Further, the number of second control channel candidates may be defined for each E-CCE aggregation level. Further, the SS may be configured for each E-CCE aggregation level. For example, a start E-CCE for configuring the SS may be configured for each E-CCE aggregation level.

The base station 100 can transmit the second control channel by using one or more E-CCE in the E-CCE that is configured in the terminal 200. The terminal 200 performs decoding of the reception signal by using one or more E-CCEs in the SS, and performs a process (blind decoding) for detecting the second control channel addressed to the terminal 200. The terminal 200 configures different SS for each E-CCE aggregation level. Thereafter, the terminal 200 performs blind decoding by using the E-CCE of the combination that is pre-determined in the different SS for each E-CCE aggregation level. In other words, the terminal 200 performs blind decoding on each second control channel candidates in different SS for each E-CCE aggregation level (monitors the E-PDCCH).

An example of SS for searching the second control channel in the terminal 200 will be described. The number of E-CCEs in the second control channel region is 16. The start E-CCE number is E-CCE 12. The SS continues to shift in the direction of the E-CCE number increasing, from the start E-CCE number in order. Further, in the SS, when the E-CCE number is the greatest E-CCE number among the E-CCEs in the second control channel region, the E-CCE number to be shifted next is the smallest E-CCE number among the E-CCEs in the second control channel region. In other words, when the number of E-CCEs in the second control channel region is N, and the start E-CCE number is X, the E-CCE number which is shifted at a m-th time is mod(X+m, N). Here, mod(A, B) represents the remainder obtained by dividing A by B. In other words, the SS is cyclically configured in the E-CCE in the second control channel region. For example, when the E-CCE aggregation level is 4, the number of E-PDCCH candidates is 2. The first E-PDCCH candidate is configured with E-CCE 12, E-CCE 13, E-CCE 14, and E-CCE 15. The second E-PDCCH candidate is configured with E-CCE 16, E-CCE 1, E-CCE 2, and E-CCE 3. Thus, as illustrated in FIG. 5 to FIG. 8, the second control channel region is configured, with predetermined RBs as a unit, such that the E-PDCCH can be mapped in a predetermined RB. In other words, it is possible to efficiently configure the resource to which E-PDCCH is mapped.

Further, another example of SS for searching the second control channel in the terminal 200 will be described. The example is different from the previously described example of SS as follows. E-CCEs constituting one E-PDCCH are cyclically configured in a predetermined E-CCE smaller than E-CCE in the second control channel region. For example, among 16 E-CCEs, the resources for every four E-CCEs from the E-CCE having smaller E-CCE number are set as a unit for mapping the one E-PDCCH. For example, when the E-CCE aggregation level is 2, the number of E-PDCCH candidates is 6. Further, each of the E-PDCCH candidates is configured (defined) to be mapped to as many as possible unit, in units of mapping one E-PDCCH. For example, the first E-PDCCH candidate is configured with E-CCE 12 and E-CCE 9. The second E-PDCCH candidate is configured with E-CCE 16 and E-CCE 13. The third E-PDCCH candidate is configured with E-CCE 4 and E-CCE 1. The fourth E-PDCCH candidate is configured with E-CCE 8 and E-CCE 5. The fifth E-PDCCH candidate is configured with E-CCE 10 and E-CCE 11. The sixth E-PDCCH candidate is configured with E-CCE 14 and E-CCE 15. Thus, as illustrated in FIG. 5 to FIG. 8, the second control channel region is configured, with predetermined RBs as a unit, such that the E-PDCCH can be mapped in a predetermined RB. In other words, it is possible to efficiently configure the resource to which E-PDCCH is mapped. Further, in the localized mapping, when one RB is configured with a predetermined E-CCE, one E-PDCCH can be mapped to only one RB. In addition, the E-PDCCH having the E-CCE aggregation level 8 is mapped to two RBs. Therefore, when performing a terminal-specific precoding process on the E-PDCCH, a gain by the precoding process is efficiently obtained. Further, the terminal 200 can recognize the candidates for detecting the mapped E-PDCCH.

In addition, in the above description, entire E-CCE obtained from the RB pairs that are configured as the second control channel region is the range for configuring the SS, but is not limited thereto. For example, E-CCEs obtained from some of the RB pairs that are configured as the second control channel region may be the range for configuring the SS. In other words, the RB pairs or E-CCEs which are configured as the second control channel region may be different from the RB pairs or E-CCEs which are configured as the SS. Even in this case, it is preferable that multiples of a predetermined number be a unit for the RB pairs which are configured as SS. For example, when the number of RB pairs which are configured as the second control channel region is 16, and the RB numbers in the second control channel region are RB 1 to RB 16, the E-CCEs configured as SS are assumed as E-CCEs obtained from RB 5 to RB 8, and RB 13 to RB 16. Further, the resource configured as SS may be E-CCE, with multiples of a predetermined number as a unit. When E-CCEs obtained from some of PRB configured as the second control channel region are assumed as a range for configuring SS, the base station 100 notifies the terminal 200 of information indicating RB pairs configured as the second control channel region, and information indicating a range configuring as SS among the RB pairs, through RRC signaling.

In addition, the case where the E-CCE aggregation levels are 1, 2, 4, and 8 has been described, but the present invention is not limited thereto. Another E-CCE aggregation level may be used in order to change predetermined reception quality of E-PDCCH or overhead due to E-PDCCH.

Hereinafter, an association between E-PDCCH (E-CCE, E-REG) and the antenna port of the terminal-specific reference signal will be described. A predefined rule is used for the association between E-PDCCH and the antenna port of the terminal-specific reference signal. Further, a plurality of association rules can be defined. When a plurality of types of association between E-PDCCH and the antenna port of the terminal-specific reference signal are defined, information indicating any of the plurality of association rules is explicitly or implicitly notified. The notification method can transmit information indicating any of the plurality of association rules through RRC signaling and configure it. Further, when another notification method is associated with control information included in control information about the second control channel notified from the base station 100, the terminal 200 can identify any of the plurality of association rules. For example, any of the plurality of association rules may be indirectly notified from information indicating distributed mapping or localized mapping which is notified through RRC signaling. Further, the information indicating any of the plurality of association rules may be configured for each terminal. Further, the information indicating any of the plurality of association rules may be configured for each second control channel to be configured. Therefore, when a plurality of second control channel regions are configured, the terminals 200 may configure any of the plurality of association rules respectively and independently.

The example of the association rule between E-PDCCH and the antenna port of the terminal-specific reference signal is a terminal-specific precoding antenna port rule. In the terminal-specific precoding antenna port rule, it is possible to perform a precoding process specific to the terminal that transmits E-PDCCH. One RB is divided into a predetermined number of resources. The divided resources are associated with the antenna ports of respective different terminal-specific reference signals. For example, one RB is divided into four resources. The four divided resources are respectively associated with the antenna ports 107 to 110. Further, respective divided resources (divided resources) can be associated with the E-CCEs in the localized mapping. In other words, respective E-CCEs in the localized mapping are associated with different antenna ports. Further, when the E-CCE aggregation level is two or more, the respective E-PDCCHs can be transmitted by using any of antenna ports associated with the divided resources to be mapped. The terminal 200 determines the antenna port of the terminal-specific reference signal for demodulation process, according to the resource in the E-PDCCH candidate to be blind-decoded. Further, the terminal 200 may be notified of the antenna port of the terminal-specific reference signal for the E-PDCCH candidate to be blind-decoded, from the base station 100. The terminal-specific precoding antenna port rule is preferably used, in the case of using the localized mapping. In addition, the terminal-specific precoding antenna port rule may be used, in the case of using the distributed mapping.

Another example of the association rule between E-PDCCH and the antenna port of the terminal-specific reference signal is a shared antenna port rule. In the shared antenna port rule, a plurality of E-PDCCHs share the antenna port of a predetermined terminal-specific reference signal. Further, in the shared antenna port rule, each terminal performs a demodulation process of E-PDCCH, by using the antenna port of the predetermined terminal-specific reference signal, but the terminal-specific reference signal of the antenna port is shared between a plurality of terminals. In the second control channel region in which the shared antenna port rule is used, some or all of the terminal-specific reference signals of the antenna ports 107 to 110 are used for the demodulation process of E-PDCCH. Specifically, in E-PDCCH mapped to the second control channel region in which the shared antenna port rule is used, either E-REG or E-CCE to which the E-PDCCH is mapped is associated with any of the antenna ports 107 to 110. In other words, in the second control channel region in which the shared antenna port rule is used, the antenna port of the terminal-specific reference signal used in E-REG or E-CCE may be selected (determined), based on the E-REG number or the E-CCE number. Further, the antenna port of the terminal-specific reference signal used in the E-REG or E-CCE may be selected based on the RNTI. The shared antenna port rule is preferably used in a case of using the distributed mapping. In addition, the shared antenna port rule may be used in a case of performing the localized mapping.

In addition, in the above description, a description has been made of the case in which the mapping method of the RB and E-CCE constituting the second control channel region is defined as the distributed mapping and the localized mapping, but the mapping method is not limited thereto. For example, the mapping method of the RB and E-CCE constituting the second control channel region may be defined as a rule of association between E-PDCCH and the antenna port of the terminal-specific reference signal. The mapping method of the RB and E-CCE constituting the second control channel region may be defined as a terminal-specific precoding antenna port rule, and a shared antenna port rule. For example, the distributed mapping in the above description may be the mapping in the case of using the shared antenna port rule. Further, the localized mapping in the above description may be the mapping in the case of using the terminal-specific precoding antenna port rule.

Hereinafter, a configuration method of the second control channel for the terminal 200 by the base station 100 (configuration method of second control channel region and configuration method of monitoring of second control channel region) will be described. As the example, the configuration of the second control channel region, and the configuration of the transmission mode implicitly indicate the configuration of the monitoring of the second control channel. The base station 100 configures the second control channel, by notifying the terminal 200 of the terminal-specific configuration information for the radio resource (RadioResourceConfigDedicated), through the control information of a higher layer (RRC signaling). The terminal-specific configuration information for the radio resource is control information used to perform configuration/change/release of the resource block, and to perform the terminal specific configuration for the physical channel.

The base station 100 notifies the terminal 200 of the terminal-specific configuration information for radio resource. The terminal 200 performs the terminal-specific configuration for the radio resource, based on the terminal-specific configuration information for the radio resource from the base station 100, and notifies the base station 100 of the configuration completion of the terminal-specific configuration information for the radio resource.

The terminal-specific configuration information for the radio resource is configured to include the terminal-specific configuration information for the physical channel (PhysicalConfigDedicated). The terminal-specific configuration information for the physical channel is control information defining the terminal-specific configuration for the physical channel. The terminal-specific configuration information for the physical channel is configured to include the configuration information of a channel status report (CQI-ReportConfig), the terminal-specific configuration information (AntennaInfoDedicated) of the antenna information, and the terminal-specific configuration information of the second control channel (EPDCCH-ConfigDedicated). The configuration information of a channel status report is used to define the configuration information for reporting the channel status in downlink. The terminal-specific configuration information of the antenna information is used to define the terminal-specific antenna information of the base station 100. The terminal-specific configuration information of the second control channel is used to define the terminal-specific configuration information of the second control channel. Further, since the terminal-specific configuration information of the second control channel is notified and configured as control information specific to the terminal 200, the configured second control channel is configured as the region specific to the terminal 200.

The configuration information of a channel status report is configured to include the configuration information of aperiodic channel status report (cqi-ReportModeAperiodic), and configuration information of periodic channel status report (CQI-ReportPeriodic). The configuration information of aperiodic channel status report is configuration information for aperiodically reporting the channel state of downlink 103, through the physical uplink shared channel (PUSCH). The configuration information of a periodic channel status report is configuration information for periodically reporting the channel state of downlink, through the physical uplink control channel (PUCCH).

The terminal-specific configuration information of the antenna information is configured to include a transmission mode. The transmission mode is information indicating a transmission mode in which the base station 100 communicates with the terminal 200. For example, the transmission mode is pre-defined as transmission modes 1 to 10. A transmission mode 1 is a transmission mode using a single antenna port transmission scheme using an antenna port 0. A transmission mode 2 is a transmission mode using a transmission diversity scheme. A transmission mode 3 is a transmission mode using a circulation delay diversity scheme. A transmission mode 4 is a transmission mode using a closed-loop spatial multiplexing scheme. A transmission mode 5 is a transmission mode using a multi-user MIMO scheme. A transmission mode 6 is a transmission mode using a closed-loop spatial multiplexing scheme. A transmission mode 7 is a transmission mode using a single antenna port transmission scheme using an antenna port 5. A transmission mode 8 is a transmission mode using a closed-loop spatial multiplexing scheme using antenna ports 7 and 8. A transmission mode 9 is a transmission mode using a closed-loop spatial multiplexing scheme using antenna ports 7 to 14. Further, the transmission modes 1 to 9 are referred to as a first transmission mode.

A transmission mode 10 is defined as a transmission mode different from the transmission modes 1 to 9. For example, the transmission mode 10 can be a transmission mode using a CoMP scheme. Here, the enhancement by the introduction of the CoMP scheme includes the optimization of the channel status report and the improvement of accuracy (for example, the introduction of preferred precoding information during CoMP communication and phase difference information between the base stations), and the like. Further, the transmission mode 10 may be a transmission mode using a communication scheme in which a multi-user MIMO scheme that can be implemented as communication scheme represented as the transmission modes 1 to 9 is enhanced (advanced). Here, the enhancement of the multi-user MIMO scheme includes the optimization of the channel status report and the improvement of accuracy (for example, the introduction of preferred channel quality indicator (CQI) information and the like during multi-user MIMO communication), and improvement of orthogonality between terminals multiplexed to the same resource. Further, the transmission mode 10 may be a transmission mode in which the second control channel region can be configured. Further, the transmission mode 10 may be a transmission mode using a CoMP scheme and/or an enhanced multi-user MIMO scheme, in addition to all or some of the communication schemes represented by the transmission modes 1 to 9. For example, the transmission mode 10 may be a transmission mode using the CoMP scheme and/or the enhanced multi-user MIMO scheme, in addition to the communication scheme represented by the transmission mode 9. Further, the transmission mode 10 may be a transmission mode in which a plurality of channel state information reference signals (CSI-RS: Channel State Information-RS) can be configured. Further, the transmission mode 10 is also referred to as a second transmission mode.

In addition, when the base station 100 transmits data channel to the terminal 200 which is set to the transmission mode 10 in which a plurality of transmission schemes can be used, the base station 100 can communicate even if there is no notification of which mode is used among the plurality of transmission schemes. In other words, even if the terminal 200 is set to the transmission mode 10 in which a plurality of transmission schemes can be used, the terminal 200 can communicate even if there is no notification of which mode is used among the plurality of transmission schemes when receiving data channels.

Here, the second transmission mode is a transmission mode in which the second control channel can be configured. In other words, when the first transmission mode is set for the terminal 200, the base station 100 maps the control channel for the terminal 200 to the first control channel region. Further, when the second transmission mode is set for the terminal 200, the base station 100 maps the control channel for the terminal 200 to the first control channel region and/or the second control channel region. Meanwhile, when the terminal 200 is set to the first transmission mode by the base station 100, the first control channel is blind-decoded. Further, when the terminal 200 is set to second transmission mode by the base station 100, the first control channel and/or the second control channel are blind-decoded.

Further, the terminal 200 configures the control channel to be blind-decoded, regardless of the transmission mode, based on whether or not the terminal-specific configuration information of the second control channel is configured by the base station 100. In other words, when the terminal-specific configuration information of the second control channel is not set for the terminal 200, the base station 100 maps the control channel for the terminal 200 to the first control channel region. Further, when the terminal-specific configuration information of the second control channel is set for the terminal 200, the base station 100 maps the control channel for the terminal 200 to the first control channel region and/or the second control channel region.

Meanwhile, when the terminal-specific configuration information of the second control channel is set by the base station 100, the terminal 200 performs blind decoding on the first control channel and/or the second control channel. Further, when the terminal-specific configuration information of the second control channel is not set by the base station 100, the terminal 200 performs blind decoding on the first control channel.

The terminal-specific configuration information of the second control channel is configured to include subframe configuration information of the second control channel (EPDCCH-SubframeConfig-r11). The subframe configuration information of the second control channel is used to define the subframe information for configuring the second control channel. The subframe configuration information of the second control channel is configured to include a subframe configuration pattern (subframeConfigPattern-r11), and configuration information of the second control channel (ePDCCH-Config-r11).

The subframe configuration pattern is information indicating the subframe for configuring the second control channel. For example, the subframe configuration pattern is information of a bitmap format of n bits. The information represented by each bit indicates whether or not the subframe is a subframe configured as the second control channel. In other words, in the subframe configuration pattern, n subframes can be configured as a period. At this time, it is possible to exclude a predetermined subframe to which the synchronization signal and the broadcast channel are mapped. Specifically, the remainder obtained by dividing the subframe number defined in each subframe by n corresponds to each bit of the subframe configuration pattern. For example, n is a previously defined value such as 8 or 40. When information for the subframe with a subframe configuration pattern is "1", the subframe is configured as the second control channel. When information for the subframe with a subframe configuration pattern is "0", the subframe is not configured as the second control channel. Further, a predetermined subframe to which the synchronization signal for the terminal 200 to synchronize with the base station 100, and the broadcast channel for broadcasting the control information of the base station 100 are mapped can be prevented from being configured in advance as the second control channel. Further, in another example of the subframe configuration pattern, a pattern of the subframe designated as the second control channel is indexed in advance, and information indicating the index is defined as the subframe configuration pattern.

The terminal-specific configuration information of the second control channel is configured to include resource allocation information (resourceBlockAssignment-r11). The resource allocation information is information designating the resource block which is configured as the second control channel. For example, it is possible to configure the second control channel region, with one RB pair as a unit.

As described above, when the second control channel is configured, the base station 100 notifies the terminal 200 of the terminal-specific configuration information for the radio resource including the terminal-specific configuration information of the second control channel, through dedicated RRC signaling. Further, when the configured second control channel is changed, similarly, the base station 100 notifies the terminal 200 of the terminal-specific configuration information for the radio resource including the terminal-specific configuration information of the second control channel having changed parameters, through dedicated RRC signaling. When the configured second control channel is released, similarly, the base station 100 transmits notification to the terminal 200 through dedicated RRC signaling. For example, the terminal-specific configuration information for the radio resource without the terminal-specific configuration information of the second control channel is notified. Further, control information for releasing the terminal-specific configuration information of the second control channel may be notified.

Since respective E-REG sets are mapped to continuous shaded REs among lattice-like REs in each of the first slot and the second slot, and REs are not continuous due to a predetermined frequency shift at the boundary of the first slot and the second slot, it is possible to reduce the variations in the number of REs included between E-REG sets, regardless of the number of CRS ports, the position of the CRS port on the frequency axis, and the number of OFDM symbols used for PDCCH.

Second Embodiment

In the first embodiment, the case is described in which each E-REG set is mapped to continuous shaded REs, among grid-like REs in each of the first slot and the second slot, and REs are not continuous due to a predetermined frequency shift at the boundary of the first slot and the second slot. In contrast, in a second embodiment, more general configuration of the RE that is included in each E-REG set will be described. Hereinafter, the second embodiment of the present invention will be described. In addition, a base station and a terminal according to the present embodiment can be achieved by a configuration similar to the configuration examples of the base station 100 and the terminal 200 illustrated in FIG. 1 and FIG. 2. Further, the present embodiment can be realized by a configuration similar to the configuration examples of the frame and channel illustrated in FIG. 3 and FIG. 4. Further, the present embodiment can be realized by the association similar to the association of between E-REG set and E-REG illustrated in FIG. 7 and FIG. 10. Therefore, detailed description will not be repeated for overlapping parts.

Also in the present embodiment, each of four E-REG sets (E-REG set 0, E-REG set 1, E-REG set 2, and E-REG set 3) is configured with 36 resource elements in the slot 0 and the slot 1.

Four E-REG sets are configured in the subframe so as to satisfy at least the following condition 1 to condition 3.

<Condition 1> In the OFDM symbols (l is 0, 1 or 4) including at least CRS, REs in four subcarriers which are subcarriers at intervals of three in one PRB pair, in other words, four REs in which k is 0, 3, 6, and 9 are included in respective different E-REG sets. Similarly, four REs in which k is 1, 4, 7, and 10 are included in respective different E-REG sets, and four REs in which k is 2, 5, 8, and 11 are included in respective different E-REG sets. In addition, for simplification of an E-REG set structure, it is more preferable to apply this condition to the OFDM symbols (l is 0 to 4) without UERS.

<Condition 2> In two OFDM symbols (l is 0 and 4) including CRS of at least one port (a single port CRS), REs in two subcarriers which are subcarriers at intervals of six in one PRB pair, in other words, four REs as a combination of two REs in which k is 0 and 6 respectively at l of 0, and two REs in which k is 3 and 9 respectively at l of 4 are included in respective different E-REG sets. Similarly, four REs as a combination of two REs in which k is 1 and 7 respectively at l of 0, and two REs in which k is 4 and 10 respectively at l of 4 are included in respective different E-REG sets, and four REs as a combination of two REs in which k is 2 and 8 respectively at l of 0, and two REs in which k is 5 and 11 respectively at l of 4 are included in respective different E-REG sets. In addition, since the structure (correspondence between RE and E-REG) of the E-REG set on two OFDM symbols (l is 0 and 4) including CRS of at least one port is common, for simplification of an E-REG set structure, it is more preferable to satisfy this condition.

<Condition 3> In REs on two OFDM symbols including UERS, in other words, 24 REs which is the sum of REs in the first slot and the second slot, in which each slot has 12 REs in which k is 2 to 4, or 7 to 9, and l is 5 or 6, the number of REs included in each E-REG set is six.

It is possible to reduce the variations in the number of REs included in four E-REG set by satisfying the above conditions, regardless of the number of CRS ports, the position of the CRS port on the frequency axis, and the number of OFDM symbols used for PDCCH. Therefore, since the determination procedure of the aggregation level which is a process for determining the coding rate of E-PDCCH is simplified, it is possible to reduce the process of the base station 100 and the terminal 200. In addition, since the E-REG set that has been described in the first embodiment also satisfies the conditions, it is possible to exhibit an effect of reducing the process of the base station 100 and the terminal 200.

In addition, the respective embodiments have been described by using the resource element and the resource block as the mapping unit of the data channel, the control channel, the PDSCH, the PDCCH, and the reference signal, and using the subframe and the radio frame as the transmission unit in the time direction, but are not limited thereto. Even if the region that is configured with any frequencies and times and a time unit are applied thereto, it is possible to achieve the same effect.

Further, the respective embodiments have been described by referring to the enhanced physical downlink control channel 103 located in the PDSCH region as E-PDCCH for clear distinction between the E-PDCCH and the physical downlink control channel (PDCCH), but are not limited thereto. Even when both are referred to as the PDCCH, if the operations are different in the enhanced physical downlink control channel located in the PDSCH region and the physical downlink control channel located in the PDCCH region, this is substantially the same as the above embodiment in which the E-PDCCH and the PDCCH are distinguished.

In addition, when the terminal 200 and the base station 100 starts communication, the base station 100 can determine whether or not the functions described in the above embodiments are available, by notifying the base station 100 of information (terminal capability information or functional group information) indicating whether or not the functions described in the above respective embodiments are available for the base station 100. More specifically, when the functions described in the above embodiments are available, the terminal capability information may include information indicating the availability, and when the functions described in the above embodiments are not available, the terminal capability information may not include information regarding the functions. Alternatively, when the functions described in the above embodiments are available, 1 may be inserted to a predetermined bit field of the function group information, and when the functions described in the above embodiments are not available, 0 may be inserted to a predetermined bit field of the function group information.

In addition, the respective embodiments have been described by using the resource element and the resource block as the mapping unit of the data channel, the control channel, the PDSCH, the PDCCH, and the reference signal, and using the subframe and the radio frame as the transmission unit in the time direction, but are not limited thereto. Even if the region that is configured with any frequencies and times and a time unit are applied thereto, it is possible to achieve the same effect. In addition, the respective embodiments have described the case of demodulation using the precoding-processed RS, and the port corresponding to the precoding-processed RS by using the port that is equivalent to the MIMO layer, but are not limited thereto. In addition to this, it is possible to achieve the same effect by applying the present invention to the ports corresponding to the reference signals which are different to each other. It is possible to use, for example, Unprecoded RS rather than Precoded RS, and a port which is equivalent to the output terminal after the precoding process, or a port which is equivalent to the physical antenna (or the combination of the physical antennas) as the port.

Further, a program operating in the base station 100 and the terminal 200 according to the present invention is a program for controlling the CPU and the like in order to realize a function of the embodiment according to the present invention (a program for causing a computer to execute the function). Then, the information handled by these devices is stored in the RAM temporarily during the process, and thereafter is stored in various ROMs and a HDD, and read by the CPU as necessary, and modification and writing are performed. Examples of a recording medium for storing a program may be any of semiconductor media (for example, a ROM, a nonvolatile memory card, or the like), optical recording media (for example, a DVD, a MO, a MD, a CD, a BD, or the like), magnetic recording media (for example, a magnetic tape, a flexible disk, or the like), and the like. Further, the functions of the above-described embodiments are realized by executing the loaded program, and the functions of the invention may be implemented by performing processes in association with an operating system or another application program based on an instruction of the program.

Further, when the program is distributed in markets, it is possible to distribute the program by being stored in a portable recording medium, or to transfer the program to a server computer connected through a network such as the Internet. In this case, the storage device of the server computer is also included in the present invention. Further, some or all of the base station 100 and the terminal 200 in the embodiment described above may be implemented as an LSI which is a typical integrated circuit. The functional blocks of the base station 100 and the terminal 200 may be made into individual chips, or some or all may be integrated and made into chips. A circuit integration method is not limited to LSI, and may be implemented by a dedicated circuit or a general-purpose processor. Further, if integrated circuit technology capable of replacing the LSI appears due to the advances in a semiconductor technology, it is also possible to use the integrated circuit by the technology.

Hitherto, the embodiments of the invention have been described in detail with reference to the drawings, but the specific configuration is not limited to the embodiments, and design change and the like without departing from the scope of the invention also is included within the scope of the claims. For example, design change of reversing the order of some processes among a series of processes may be performed. Further, the present invention is susceptible to various changes within the scope of the claims, and also the embodiment obtained by appropriately combining the technical means disclosed in different embodiments is within the technical scope of the present invention. Further, the present invention includes a configuration obtained by replacing the elements with each other that are described in the above respective embodiments and have the same effect.

(1) The invention has been made in order to solve the above problems, a base station according to an aspect of the present invention is a base station that communicates with a terminal by using a resource element which is configured with an OFDM symbol and a subcarrier, and a resource block pair configured with a predetermined number of resource elements, including a second control channel generation unit that generates a second control channel which is transmitted by using a reference signal of an antenna port different from that of a first control channel, in which the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(2) Further, the base station according to the aspect of the present invention is a base station, in which the number of resource elements constituting E-REG set is equal in a resource block pair, and the number of resource elements constituting E-REG is equal in the resource block pair.

(3) Further, the base station according to the aspect of the present invention is a base station, in which E-REG constituting E-CCE is determined based on the E-REG constituting E-REG set.

(4) Further, the base station according to the aspect of the present invention is a base station, in which when the second control channel is transmitted by using the localized mapping, E-CCE is configured with a plurality of E-REGs in one resource block pair, and when the second control channel is transmitted by using the distributed mapping, E-CCE is configured with a plurality of E-REGs in a plurality of the resource block pairs.

(5) Further, the base station according to the aspect of the present invention is a base station, in which an antenna port of a reference signal used in transmission of the second control channel is determined based on the E-REG set.

(6) Further, the base station according to the aspect of the present invention is a base station, in which in OFDM symbols including cell-specific reference signal, a total of four resource elements at four subcarriers which are subcarriers at intervals of three in one resource block pair constitute E-REGs respectively including different E-REG sets.

(7) Further, the base station according to the aspect of the present invention is a base station, in which the correspondence between the resource element and the E-REG set is common in two OFDM symbol including a cell-specific reference signal for a single antenna port in a slot.

(8) Further, a terminal according to another aspect of the present invention is a terminal that communicates with a base station by using a resource element which is configured with an OFDM symbol and a subcarrier, and a resource block pair configured with a predetermined number of resource elements, including a control channel processing unit that detects a second control channel by using a reference signal of an antenna port different from that of a first control channel, in which the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(9) Further, the terminal according to the aspect of the present invention is a terminal, in which the number of resource elements constituting E-REG set is equal in a resource block pair, and the number of resource elements constituting E-REG is equal in the resource block pair.

(10) Further, the terminal according to the aspect of the present invention is a terminal, in which E-REG constituting E-CCE is determined based on the E-REG constituting E-REG set.

(11) Further, the terminal according to the aspect of the present invention is a terminal, when the second control channel is transmitted by using a localized mapping, E-CCE is configured with a plurality of E-REGs in one resource block pair, and when the second control channel is transmitted by using a distributed mapping, E-CCE is configured with a plurality of E-REGs in a plurality of resource block pairs.

(12) Further, the terminal according to the aspect of the present invention is a terminal, the antenna port of the reference signal used in detection of the second control channel is determined based on the E-REG set.

(13) Further, the terminal according to the aspect of the present invention is a terminal in which in OFDM symbols including cell-specific reference signal, a total of four resource elements at four subcarriers which are subcarriers at intervals of three in one resource block pair constitute E-REGs respectively including different E-REG sets.

(14) Further, the base station according to the aspect of the present invention is a terminal, in which association between the resource element and the E-REG set is common in two OFDM symbols that can include cell-specific reference signal for a single antenna port, in a slot.

(15) Further, a communication system according to another aspect of the present invention is a communication system in which a base station and a terminal communicate by using a resource element which is configured with an OFDM symbol and a subcarrier, and a resource block pair configured with a predetermined number of resource elements, in which the base station includes a second control channel generation unit that generates a second control channel which is transmitted by using a reference signal of an antenna port different from that of a first control channel, the terminal includes a control channel processing unit that detects a second control channel by using the reference signal, the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(16) Further, a communication method according to another aspect of the present invention is a communication method of a base station that communicates with a terminal by using a resource element which is configured with an OFDM symbol and a subcarrier, and a resource block pair configured with a predetermined number of resource elements, including a step of generating a second control channel which is transmitted by using a reference signal of an antenna port different from that of a first control channel, in which the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(17) Further, a communication method according to another aspect of the present invention is a communication method of a terminal that communicates with a base station by using a resource element which is configured with an OFDM symbol and a subcarrier, and a resource block pair configured with a predetermined number of resource elements, including a step of detecting a second control channel by using a reference signal of an antenna port different from that of a first control channel, in which the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(18) Further, a communication method according to another aspect of the present invention is a communication method of a communication system in which a base station and a terminal communicate by using a resource element which is configured with an OFDM symbol and a subcarrier, and a resource block pair configured with a predetermined number of resource elements, in which the base station includes a step of generating a second control channel which is transmitted by using a reference signal of an antenna port different from that of a first control channel, the terminal includes a step of detecting a second control channel by using the reference signal, the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(19) Further, an integrated circuit according to another aspect of the present invention is an integrated circuit implemented in a base station that communicates with a terminal by using a resource element which is configured with an OFDM symbol and a subcarrier, and a resource block pair configured with a predetermined number of resource elements, implementing a function of generating a second control channel which is transmitted by using a reference signal of an antenna port different from that of a first control channel, in which the second control channel is transmitted to the terminal by using one or more E-CCEs which are configured with a predetermined E-REGs, the resource block pair is configured with a predetermined number of E-REG sets, E-REG set is configured with a predetermined number of E-REGs, and E-REG is configured with a predetermined number of resource elements.

(20) Further, an integrated circuit according to another aspect of the present invention is an integrated circuit implemented in a terminal that communicates with a base station by using a resource element which is configured with an OFDM symbol and a subcarrier, and a resource block pair configured with a predetermined number of resource elements, implementing a function of detecting a second control channel by using a reference signal of an antenna port different from that of a first control channel, in which the second control channel is transmitted to the terminal by using one or more E-CCEs which are configured with a predetermined E-REGs, the resource block pair is config-ured with a predetermined number of E-REG sets, E-REG set is configured with a predetermined number of E-REGs, and E-REG is configured with a predetermined number of resource elements.

(21) Further, an integrated circuit according to another aspect of the present invention is an integrated circuit implemented in a communication system in which a base station and a terminal communicate by using a resource element which is configured with an OFDM symbol and a subcarrier, and a resource block pair configured with a predetermined number of resource elements, in which the base station implements a function of generating a second control channel which is transmitted by using a reference signal of an antenna port different from that of a first control channel, the terminal implements a function of detecting a second control channel by using the reference signal, the second control channel is transmitted to the terminal by using one or more E-CCEs which are configured with a predetermined E-REGs, the resource block pair is config-ured with a predetermined number of E-REG sets, E-REG set is configured with a predetermined number of E-REGs, and E-REG is configured with a predetermined number of resource elements.

INDUSTRIAL APPLICABILITY

The present invention is suitable to be used in a wireless base station device, a wireless terminal device, a wireless communication system, and a wireless communication method.

REFERENCE SIGNS LIST

100 BASE STATION
101, 206 HIGHER LAYER
102 DATA CHANNEL GENERATION UNIT
103 SECOND CONTROL CHANNEL GENERATION UNIT
104 TERMINAL-SPECIFIC REFERENCE SIGNAL MULTIPLEXING UNIT
105 PRECODING UNIT
106 FIRST CONTROL CHANNEL GENERATION UNIT
107 CELL-SPECIFIC REFERENCE SIGNAL MULTI-PLEXING UNIT
108 TRANSMISSION SIGNAL GENERATION UNIT
109 TRANSMISSION UNIT
200, 1104 TERMINAL
201 RECEPTION UNIT
202 RECEPTION SIGNAL PROCESSING UNIT
203 PROPAGATION PATH ESTIMATION UNIT
204 CONTROL CHANNEL PROCESSING UNIT
205 DATA CHANNEL PROCESSING UNIT
1301 MACRO BASE STATION
1302, 1303 RRH
1308, 1309 LINE
1305, 1306, 1307 COVERAGE

The invention claimed is:

1. A base station apparatus configured to communicate with a terminal apparatus, the base station apparatus comprising:
control circuitry configured to determine one or several enhanced control channel elements used to receive an enhanced physical downlink control channel, the one or several enhanced control channel elements included in a resource block set corresponding to a plurality of resource block pairs, the enhanced physical downlink control channel being transmitted using either localized transmission or distributed transmission; and transmitting circuitry configured to transmit the enhanced physical downlink control channel, the enhanced physical downlink control channel being transmitted using either localized transmission or distributed transmission, wherein each of the plurality of resource block pairs includes a specific number of enhanced resource element groups, first resource elements except second resource elements carrying demodulation reference signal in each of the plurality of resource block pairs are numbered, each of the specific number of enhanced resource element groups is constituted of third resource elements with a same number in each of the plurality of resource block pairs, the third resource elements being a part of the first resource elements, each of the one or several enhanced control channel elements consists of a plurality of enhanced resource element groups, for the localized transmission, the control circuitry determines first enhanced resource element groups for each of the one or several enhanced control channel elements and the first enhanced resource element groups are in a resource block pair among the plurality of resource block pairs, for the distributed transmission, the control circuitry determines second enhanced resource element groups for each of the one or several enhanced control channel elements and the second enhanced resource element groups are in a plurality of resource block pairs among the plurality of resource block pairs, and first combination and second combination are common each other, the first combination being for the localized transmission, the second combination being for the distributed transmission, the first and the second combinations being combinations of numbers of enhanced resource element groups corresponding to each of the one or several enhanced control channel elements.

2. A terminal apparatus configured to communicate with a base station apparatus, the terminal apparatus comprising:

control circuitry configured to determine one or several enhanced control channel elements used to receive an enhanced physical downlink control channel, the one or several enhanced control channel elements included in a resource block set corresponding to a plurality of resource block pairs; and receiving circuitry configured to receive the enhanced physical downlink control channel the enhanced physical downlink control channel being transmitted using either localized transmission or distributed transmission, wherein each of the plurality of resource block pairs includes a specific number of enhanced resource element groups, first resource elements except second resource elements carrying demodulation reference signal in each of the plurality of resource block pairs are numbered, each of the specific number of enhanced resource element groups is constituted of third resource elements with a same number in each of the plurality of resource block pairs, the third resource elements being a part of the first resource elements, each of the one or several enhanced control channel elements consists of a plurality of enhanced resource element groups, for the localized transmission, the control circuitry determines first enhanced resource element groups for each of the one or several enhanced control channel elements and the first enhanced resource element groups are in a resource block pair among the plurality of resource block pairs, for the distributed transmission, the control circuitry determines second enhanced resource element groups for each of the one or several enhanced control channel elements and the second enhanced resource element groups are in a plurality of resource block pairs among the plurality of resource block pairs, and first combination and second combination are common each other, the first combination being for the localized transmission, the second combination being for the distributed transmission, the first and the second combinations being combinations of numbers of enhanced resource element groups corresponding to each of the one or several enhanced control channel elements.

3. A communicating method of a base station apparatus that communicates with a terminal apparatus, the communicating method comprising:

determining one or several enhanced control channel elements used to receive an enhanced physical downlink control channel, the one or several enhanced control channel elements included in a resource block set corresponding to a plurality of resource block pairs, the enhanced physical downlink control channel being transmitted using either localized transmission or distributed transmission; and transmitting the enhanced physical downlink control channel, the enhanced physical downlink control channel being transmitted using either localized transmission or distributed transmission, wherein each of the plurality of resource block pairs includes a specific number of enhanced resource element groups, first resource elements except second resource elements carrying demodulation reference signal in each of the plurality of resource block pairs are numbered, each of the specific number of enhanced resource element groups is constituted of third resource elements with a same number in each of the plurality of resource block pairs, the third resource elements being a part of the first resource elements, each of the one or several enhanced control channel elements consists of a plurality of enhanced resource element groups, for the localized transmission, the communicating method further comprises determining first enhanced resource element groups for each of the one or several enhanced control channel elements and the first enhanced resource element groups are in a resource block pair among the plurality of resource block pairs, for the distributed transmission, the communicating method further comprises determining second enhanced resource element groups for each of the one or several enhanced control channel elements and the second enhanced resource element groups are in a plurality of resource block pairs among the plurality of resource block pairs, and first combination and second combination are common each other, the first combination being for the localized transmission, the second combination being for the distributed transmission, the first and the second combinations being combinations of numbers of enhanced resource element groups corresponding to each of the one or several enhanced control channel elements.

4. A communicating method of a terminal apparatus that communicates with a base station apparatus, the communicating method comprising:

determining one or several enhanced control channel elements used to receive an enhanced physical downlink control channel, the one or several enhanced control channel elements being included in a resource block set corresponding to a plurality of resource block pairs; and receiving the enhanced physical downlink control channel, the enhanced physical downlink control channel being transmitted using either localized transmission or distributed transmission, wherein each of the plurality of resource block pairs includes a specific number of enhanced resource element groups, first resource elements except second resource elements carrying demodulation reference signal in each of the plurality of resource block pairs are numbered, each of the specific number of enhanced resource element groups is constituted of third resource elements with a same number in each of the plurality of resource block pairs, the third resource elements being a part of the first resource elements, each of the one or several enhanced control channel elements consists of a plurality of enhanced resource element groups, for the localized transmission, the communicating method further comprises determining first enhanced resource element groups for each of the one or several enhanced control channel elements and the first enhanced resource element groups are in a resource block pair among the plurality of resource block pairs, for the distributed transmission, the communicating method further comprises determining second enhanced resource element groups for each of the one or several enhanced control channel elements and the second enhanced resource element groups are in a plurality of resource block pairs among the plurality of resource block pairs, and first combination and second combination are common each other, the first combination being for the localized transmission, the second combination being for the distributed transmission, the first and the second combinations being combinations of numbers of enhanced resource element groups corresponding to each of the one or several enhanced control channel elements.

* * * * *